(12) United States Patent
Kato et al.

(10) Patent No.: US 11,643,174 B2
(45) Date of Patent: May 9, 2023

(54) SMALL PLANING WATERCRAFT WITH IMAGING DEVICE

(71) Applicant: Kawasaki Jukogyo Kabushiki Kaisha, Kobe (JP)

(72) Inventors: Hironori Kato, Akashi (JP); Toshio Araki, Kakogawa (JP); Hiroaki Maeda, Kakogawa (JP); Yoshinobu Uozumi, Akashi (JP)

(73) Assignee: Kawasaki Motors, Ltd., Hyogo (JP)

( * ) Notice: Subject to any disclaimer, the term of this patent is extended or adjusted under 35 U.S.C. 154(b) by 200 days.

(21) Appl. No.: 17/091,056

(22) Filed: Nov. 6, 2020

(65) Prior Publication Data

US 2022/0144389 A1 May 12, 2022

(51) Int. Cl.
| | |
|---|---|
| *B63B 34/10* | (2020.01) |
| *B63B 49/00* | (2006.01) |
| *B63H 21/14* | (2006.01) |
| *B63H 21/21* | (2006.01) |

(52) U.S. Cl.
CPC .............. *B63B 34/10* (2020.02); *B63B 49/00* (2013.01); *B63H 21/14* (2013.01); *B63H 21/213* (2013.01)

(58) Field of Classification Search
CPC ......... B63B 34/10; B63B 49/00; B63B 21/14; B63B 21/213
See application file for complete search history.

(56) References Cited

U.S. PATENT DOCUMENTS

| | | | | |
|---|---|---|---|---|
| 10,272,848 | B2 * | 4/2019 | Troxel | H04N 5/2252 |
| 2005/0092223 | A1 * | 5/2005 | Tsumiyama | B63B 34/10 |
| | | | | 114/55.5 |
| 2016/0368578 | A1 * | 12/2016 | Walke | H04N 5/2253 |
| 2021/0261229 | A1 * | 8/2021 | Terada | H04N 7/181 |
| 2021/0269128 | A1 * | 9/2021 | Rivers | B63B 79/40 |
| 2022/0089259 | A1 * | 3/2022 | Williams | B63C 9/0005 |

FOREIGN PATENT DOCUMENTS

JP 2005-132254 A1 5/2005

\* cited by examiner

*Primary Examiner* — S. Joseph Morano
*Assistant Examiner* — Jovon E Hayes
(74) *Attorney, Agent, or Firm* — Burr Patent Law, PLLC

(57) ABSTRACT

A small planing watercraft with an imaging device includes: the imaging device incorporated in the small planing watercraft, and capturing an image of surroundings of the small planing watercraft; and a display device incorporated in the small planing watercraft at a location where the display device is recognizable by an operator of the small planing watercraft, and displaying the image of surroundings captured by the imaging device.

15 Claims, 15 Drawing Sheets

FIG. 4
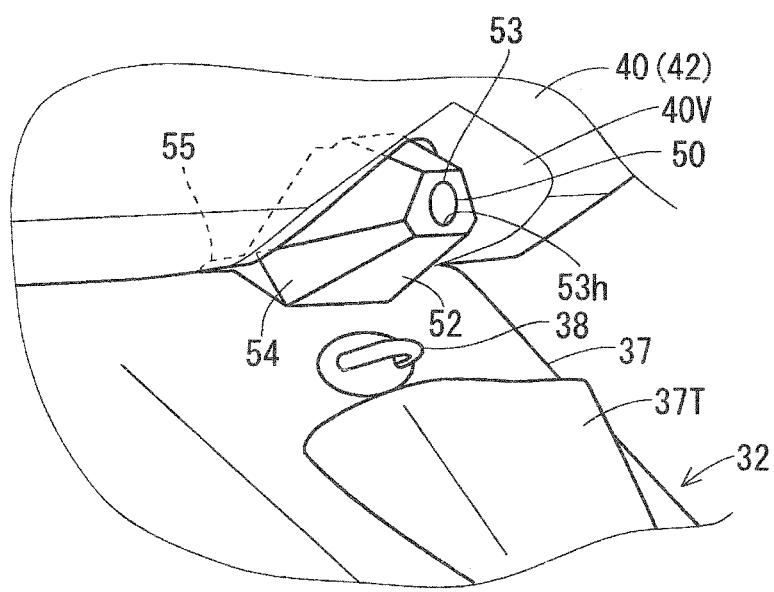
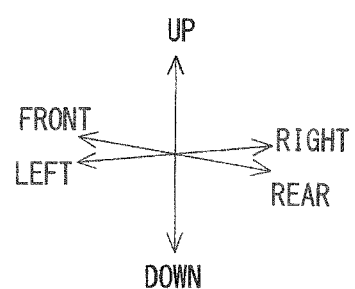

F I G. 7
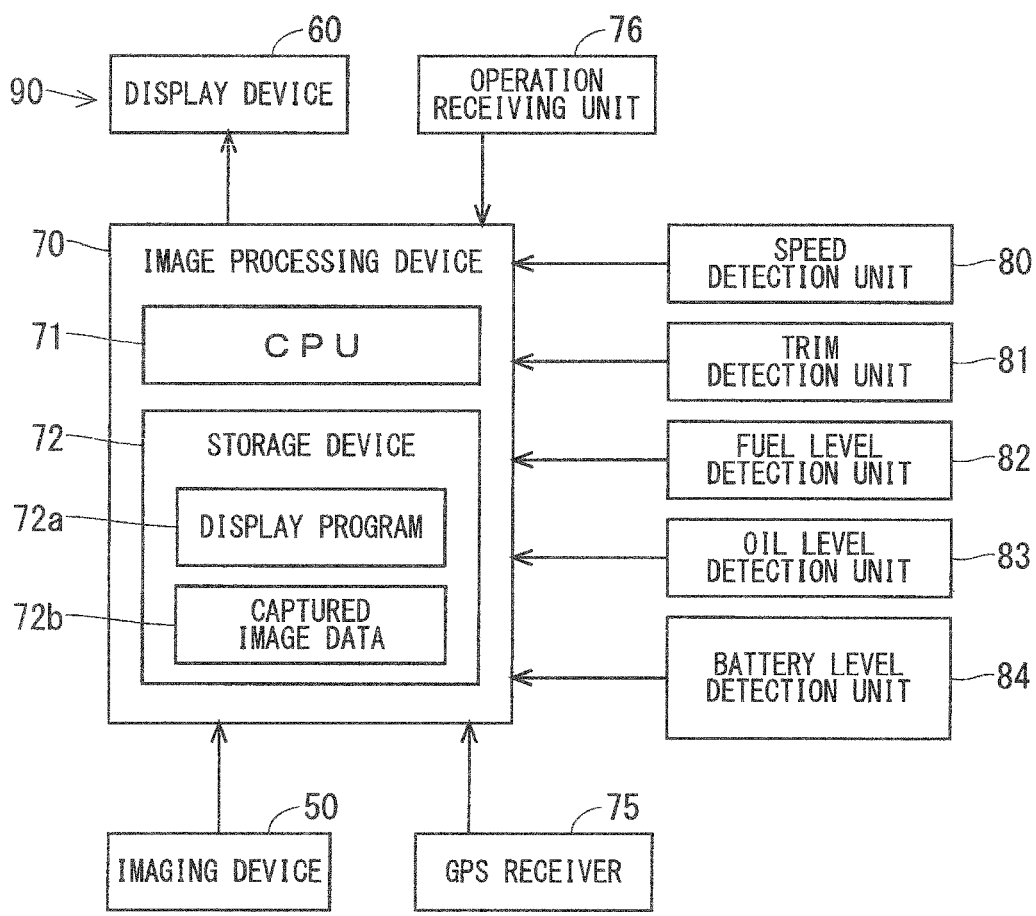

F I G. 1 2
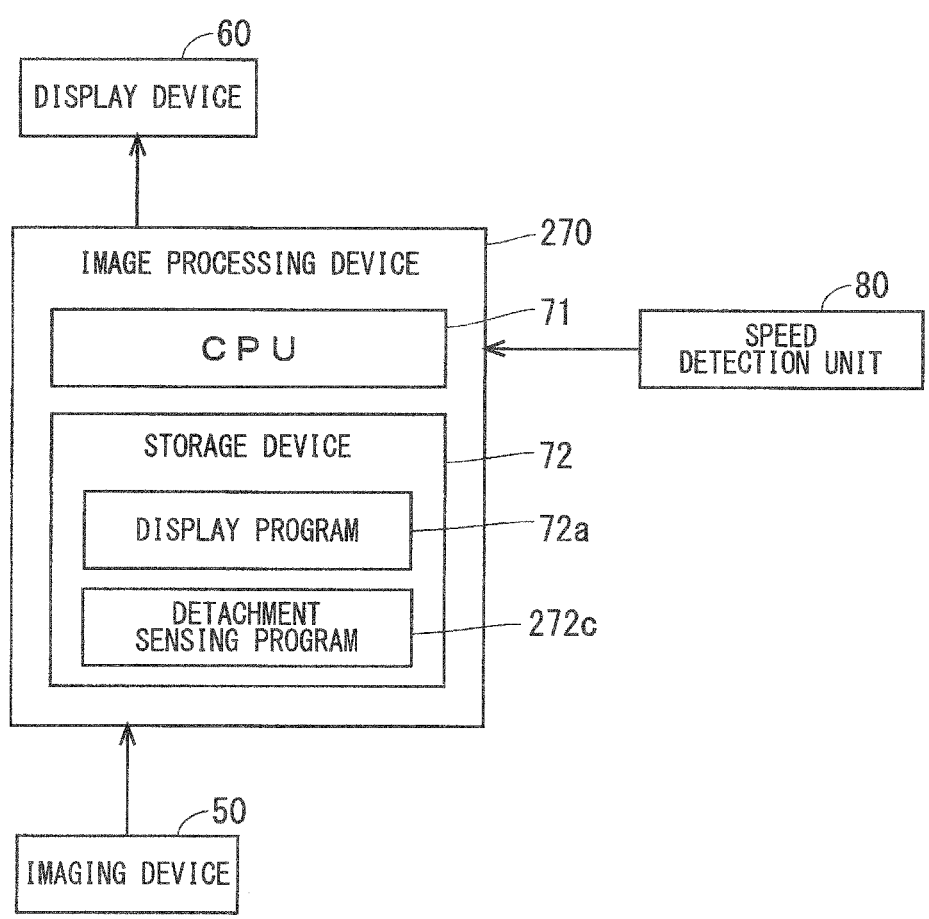

SMALL PLANING WATERCRAFT WITH IMAGING DEVICE

BACKGROUND OF THE INVENTION

Field of the Invention

The present disclosure relates to small planing watercrafts.

Description of the Background Art

Japanese Patent Application Laid-Open No. 2005-132254 discloses a small planing watercraft in which a rearview mirror assembly is fixed to a dock portion in front of a handle.

During sailing of the small planing watercraft, there is a region that is less-visible depending on a position of an operator. It is thus desirable for the operator to be able to more easily recognize surrounding conditions during sailing.

SUMMARY

It is an object of the present disclosure to enable an operator to more easily recognize surrounding conditions during sailing of a small planing watercraft.

To solve the above-mentioned problem, a small planing watercraft with an imaging device includes: the imaging device incorporated in the small planing watercraft, and capturing an image of surroundings of the small planing watercraft; and a display device incorporated in the small planing watercraft at a location where the display device is recognizable by an operator of the small planing watercraft, and displaying the image of surroundings captured by the imaging device.

The operator can thereby more easily recognize surrounding conditions during sailing of the small planing watercraft.

Another small planing watercraft includes: a sensor outputting information for determining that part or all of a towed object has been detached; and a device notifying an operator of detachment of the towed object based on an output of the sensor.

In this case, the operator can easily recognize detachment of the towed object.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a perspective view illustrating a rear portion of an elongated protruding portion;

FIG. 7 is a block diagram showing an electrical configuration of the small planing watercraft with the imaging device;

FIG. 12 is a block diagram showing an electrical configuration of a small planing watercraft with an imaging device according to a second modification;

DESCRIPTION OF THE PREFERRED EMBODIMENTS

Figure 1:
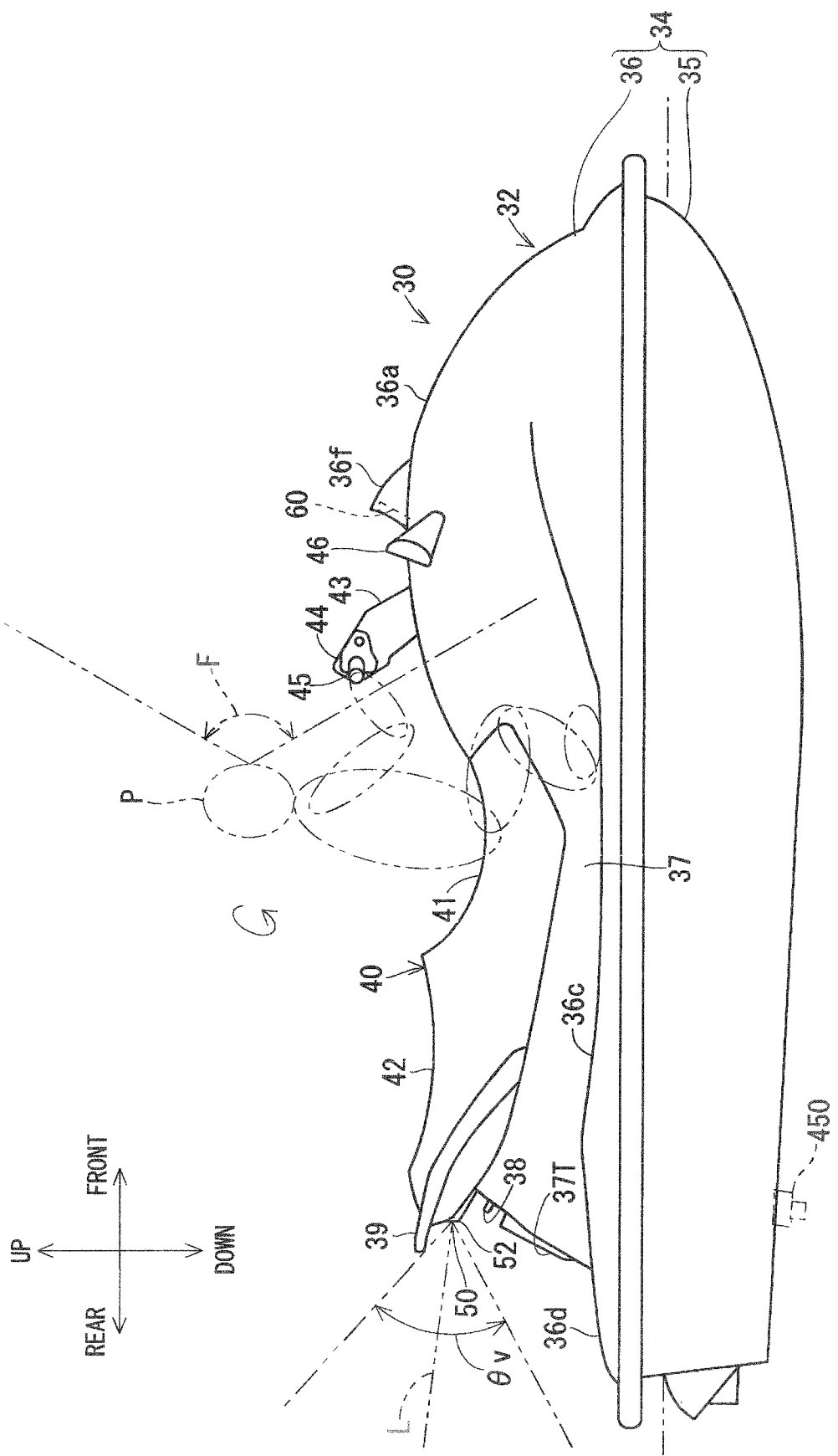
FIG. 1 is a side view illustrating a small planing watercraft with an imaging device.
Figure 2:
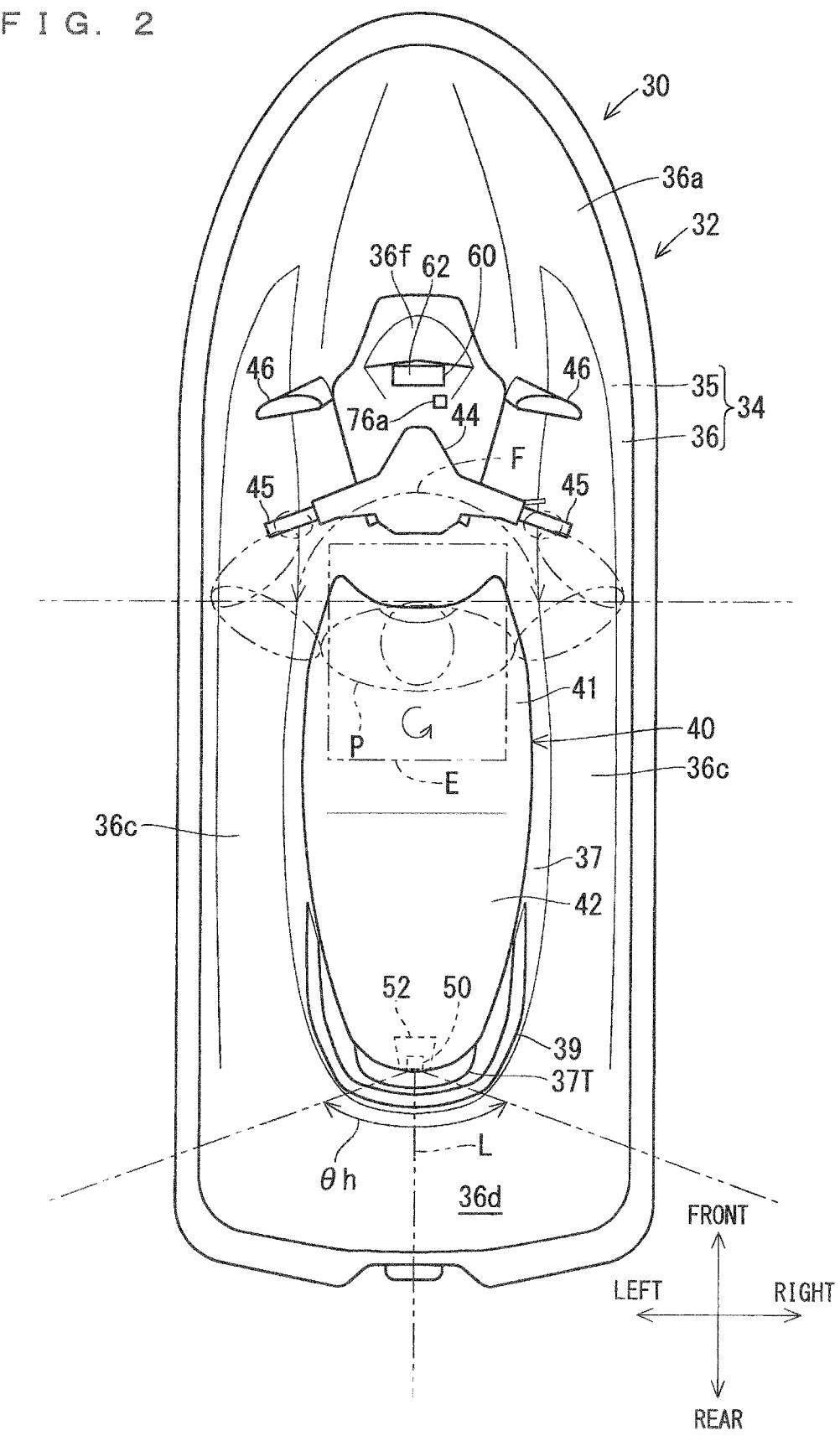
FIG. 2 is a plan view illustrating the small planing watercraft with the imaging device.
Figure 3:
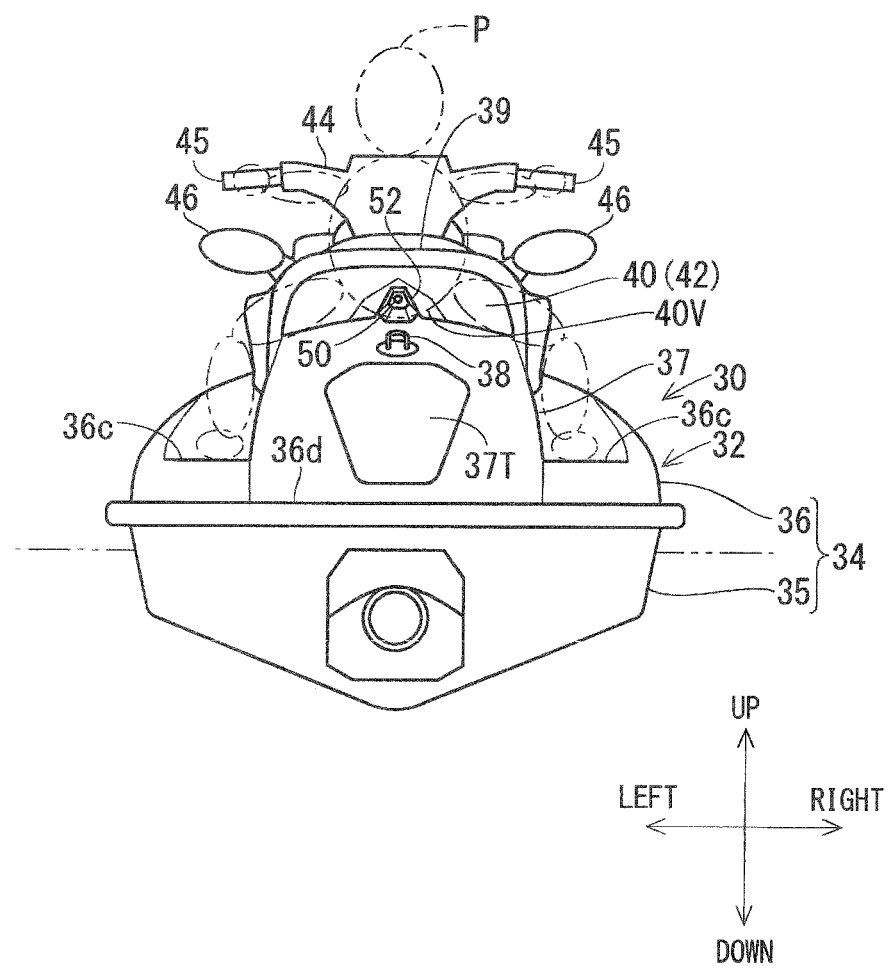
FIG. 3 is a rear view illustrating the small planing watercraft with the imaging device.

A small planing watercraft with an imaging device according to an embodiment will be described below. FIGS. 1, 2, and 3 are respectively a side view, a plan view, and a rear view illustrating a small planing watercraft with an imaging device 30.

The small planing watercraft with the imaging device 30 includes a small planing watercraft 32, and also includes an imaging device 50 and a display device 60 both incorporated in the small planing watercraft 32. The imaging device 50 captures an image of surroundings of the small planing watercraft 32. The display device 60 is incorporated in the small planing watercraft 32 at a location where the display device 60 is recognizable by an operator P of the small planing watercraft 32. For example, the display device 60 is disposed in front of a seat 40 to seat the operator P. At this attachment location, the display device 60 should face rearward, that is to say, be oriented toward a face of the operator P seated on a seat front portion 41, for example. The display device 60 may be attached to the small planing watercraft 32 so that a display of the display device 60 opposes the operator P. The image of surroundings captured by the imaging device 50 is displayed by the display device 60. The operator P can thereby easily recognize conditions surrounding the small planing watercraft 32 during operation. The imaging device 50 may capture an image in a range to be a blind area for the operator P. For example, the imaging device 50 may capture an image behind the small planing watercraft 32. In this case, the image in the range to be the blind area captured by the imaging device 50 is displayed by the display device 60. By viewing the display device 60, the operator P can easily recognize conditions in the range to be the blind area.

The small planing watercraft 32 is a boat raised by lift when moving forward and planing to slide across a water surface. For example, the small planing watercraft 32 may have a size for a single person, two to four people, or five or more people. One example of the small planing watercraft 32 is a personal watercraft (PWC). The small planing watercraft 32 may be a motorboat. In the present embodiment, an example in which the small planing watercraft 32 is the PWC will be described.

The small planing watercraft 32 includes a body 34, the seat 40, and a handle 44. The body 34 is a structure of the small planing watercraft 32 to form a space to generate buoyancy in water. The seat 40 to seat the operator P is disposed on the body 34. The handle 44 is disposed above the body 34 and in front of the seat 40. The operator P can operate the handle 44 in a state of being seated on the seat 40.

More specifically, the body 34 includes a hull 35 and a deck 36. The hull 35 is a container-like portion closing on a lower side and opening on an upper side, and capable of floating on the water surface. An opening on the upper side of the hull 35 is covered with the deck 36. A propulsion device to drive the small planing watercraft 32 forward is incorporated in the body 34. The propulsion device includes, for example, a propulsion engine E disposed within the body 34, an impeller (not illustrated) driven to rotate by the propulsion engine E (FIG. 2), a stator vane (not illustrated), and a nozzle (not illustrated). A water passage to take in water outside the body and jet the water rearward is formed in the body 34, and the impeller is disposed within the passage. The impeller is driven to rotate by the propulsion engine E to allow water within the passage to flow beyond the impeller. The stator vane disposed behind the impeller within the passage rectifies a swirling flow behind the impeller to allow water to flow further rearward. The nozzle is disposed at a rear end of the passage, and water flowing from the impeller through the stator vane is compressed by the nozzle, and jetted behind the body 34 to thereby generate propulsion for the small planing watercraft 32. The small planing watercraft 32 may be driven forward by rotating a screw disposed outside the body. The propulsion engine E may be any engine capable of generating propulsion for the small planing watercraft 32. The propulsion engine E may be, for example, an internal combustion engine to generate rotary drive force through fuel combustion or an electrical motor to generate the rotary drive force using electrical energy.

With reference to a position of the operator operating the small planing watercraft 32 in a planing state, a side in front of the operator is a front side, and a side behind the operator is a rear side. A left side and a right side are determined with reference to a state of the operator facing forward, and, with reference to the operator, a side of the hull 35 and a side of the deck 36 are respectively a lower side and an upper side.

A front portion of the deck 36 is formed to be a bulge portion 36a that becomes gradually wider and gradually bulges upward from a front end toward the rear. From a middle portion along the width at a rear end of the bulge portion 36a of the deck 36, an elongated protruding portion 37 protruding upward toward a rear end of the deck 36 is formed. The elongated protruding portion 37 has a smaller width than the deck 36. Portions of the deck 36 on opposite sides of the elongated protruding portion 37 are formed to be side floors 36c expanding at a lower location than the elongated protruding portion 37. A rear end of the elongated protruding portion 37 is located in front of the rear end of the deck 36. A portion of the deck 36 behind the elongated protruding portion 37 is formed to be a rear floor 36d expanding at a lower location than the elongated protruding portion 37. For example, baggage is mountable on the rear floor 36d. The rear floor 36d is one example of a mount on which the baggage is mountable.

The seat 40 is disposed on the top of the elongated protruding portion 37. The seat 40 is a portion in which the operator P is seated to straddle a saddle. In the present embodiment, the seat 40 is longer in a fore-aft direction. More specifically, the seat 40 includes the seat front portion 41 and a seat rear portion 42 behind the seat front portion 41. The seat front portion 41 is at a lower location than the seat rear portion 42. The operator P is seated on the seat front portion 41, and a passenger is seated on the seat rear portion 42. A grip 39 is disposed around a rear portion of the seat rear portion 42.

The grip 39 is an arch curved to protrude rearward. Opposite ends of the grip 39 are supported by a rear portion of the elongated protruding portion 37 so that an intermediate portion of the grip 39 is located apart from the seat rear portion 42 behind the seat rear portion 42. The grip 39 may be used as a grip to support the body of a person who is trying to ride on the small planing watercraft from behind.

The handle 44 is disposed in front of the seat 40. The handle 44 is attached to an upper end of a columnar portion 43 protruding from the deck 36. The handle 44 includes a pair of handle grips 45 extending laterally from the upper end of the columnar portion 43. In a state of being seated on the seat front portion 41, the operator P can operate the small planing watercraft 32 while holding the pair of handle grips 45. A position of the operator P to operate the small planing watercraft 32 is thus a position of being seated on the seat front portion 41 while facing forward. The operator P in this operating position has a field of view F in a predetermined range around an axis in the fore-aft direction. With reference to the position of the operator P facing forward along the axis in the fore-aft direction, the field of view F is within a range of at most 90° in vertical and horizontal directions, for example. A blind area G may be outside a field of vision of the operator P when the operator P faces forward. The blind area G thus includes a range outside the range of the above-mentioned field of view F. For example, a range behind the operator P is within a range of the blind area G. Furthermore, a range below the body 34, for example, a range in water hidden by the body itself from the operator P seated on the seat front portion 41 is the blind area G. The blind area G herein refers to a range that cannot directly be viewed by the operator P with reference to the operating position. The above-mentioned blind area G may be understood with reference to the operator P of average build (e.g., being 170 cm tall). Regardless of build, the blind area G includes a range directly behind the body 34 and a range below the body 34. The blind area G may further include ranges directly lateral to the seat rear portion 42. The blind area G may include a range below a bow of the body 34.

The blind area G may be a range that the operator P cannot see directly and through auxiliary mirrors 46 with reference to the operating position. The pair of auxiliary mirrors 46 is herein disposed on the body 34 in front of the seat 40. More specifically, the pair of auxiliary mirrors 46 is disposed on the bulge portion 36a of the deck 36 in front of the handle grips 45. The pair of auxiliary mirrors 46 protrudes on opposite sides of the bulge portion 36a, and has reflecting surfaces facing the operator P (rearward). The operator P seated on the seat 40 can see a range behind the operator P reflected in the reflecting surfaces of the auxiliary mirrors 46 by viewing the reflecting surfaces while facing forward. For example, a range directly behind the operator P is a range that the operator P cannot see even through the auxiliary mirrors 46 as the operator P itself or a passenger riding behind the operator P becomes an obstacle. A range directly below the body 34 cannot be seen depending on the shape and mounting locations on the body of the auxiliary mirrors 46. The blind area G thus includes the range directly behind the body 34 and the range below the body 34 regardless of whether the auxiliary mirrors 46 are disposed. The auxiliary mirrors 46 make ranges obliquely behind the operator P visible to the operator P. For example, ranges that are directly lateral to the seat rear portion 42 and are not reflected in the above-mentioned auxiliary mirrors 46 (obliquely downward ranges hidden by the body 34 and ranges laterally far apart from the body 34) are thus included in the blind area G.

The display device 60 is incorporated in the small planing watercraft 32 at a location in front of the seat 40. For example, the display device 60 is incorporated in the small planing watercraft 32 at a location where the display device 60 is recognizable by the operator P. In the present embodiment, the display device 60 is located to be recognizable by the operator P seated on the seat front portion 41 while holding the handle 44. For example, the display device 60 is incorporated in front of the location of the operator P of the small planing watercraft 32. In the present embodiment, the display device 60 is attached to the middle portion along the width at the rear end of the bulge portion 36a. A hood 36f may cover the display device 60 from above. The display device 60 may be incorporated in the handle 44, for example, between the handle grips 45. The display device 60 may be incorporated in a portion below the handle 44, for example, in the columnar portion 43.

Examples of the display device 60 include a liquid crystal display or an organic electro-luminescence (EL) display. The display device 60 displays visual information for the operator P. The operator P can acquire the visual information displayed by the display device 60 by viewing the display device 60 while operating the small planing watercraft 32.

The imaging device 50 captures the image of surroundings of the small planing watercraft 32. The imaging device 50 is attached to the small planing watercraft 32. The imaging device 50 may be attached to any portion of the small planing watercraft 32, and is attached, for example, to the body 34. The imaging device 50 should be incorporated in the small planing watercraft 32 at a location where the imaging device 50 can capture an image including a range to be the blind area G for the operator P of the small planing watercraft 32.

In the present embodiment, the imaging device 50 is incorporated in the small planing watercraft 32 at a location where the imaging device 50 can capture an image including a range behind (in particular, directly behind) the seat 40 to be the blind area G. More specifically, the imaging device 50 is attached to a rear portion of the body 34. Attachment of the imaging device 50 to the rear portion of the body 34 contributes to capturing an image behind the seat 40 by the imaging device 50 without being obstructed by a structure, a rider, and the like on the body 34.

More specifically, the imaging device 50 is attached to the rear portion of the elongated protruding portion 37. In this case, water is less likely to be splashed on the imaging device 50 because there are the side floors 36c on left and right sides of the rear portion of the elongated protruding portion 37 and the rear floor 36d behind the elongated protruding portion 37. The imaging device 50 is attached to an upper portion of the rear portion of the elongated protruding portion 37. In this case, the small planing watercraft 32 is less likely to appear in close-up in the imaging device 50 because the side floors 36c and the rear floor 36d are located apart from the imaging device 50 below the imaging device 50. The image of surroundings is thus captured to be as wide as possible.

Figure 5:
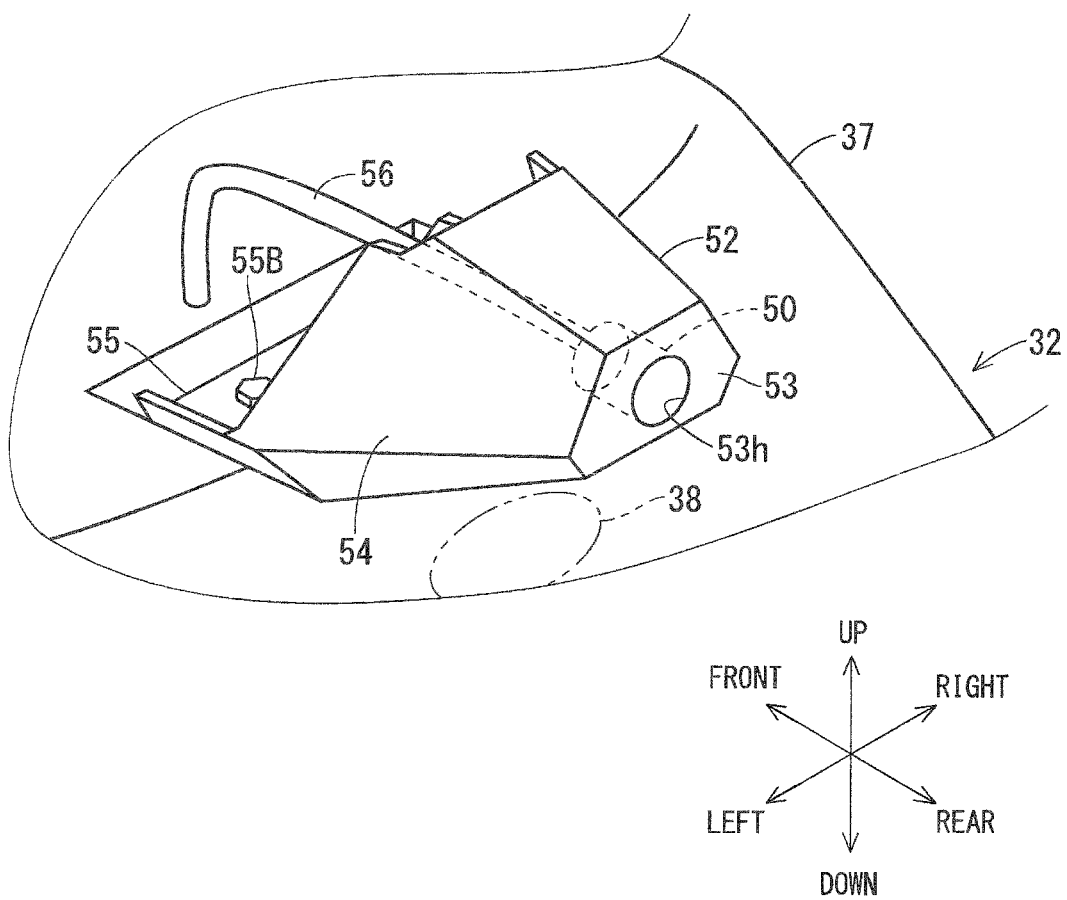
FIG. 5 is a perspective view illustrating the rear portion of the elongated protruding portion.

An example of a structure to attach the imaging device 50 will be described. FIGS. 4 and 5 are each a perspective view illustrating the rear portion of the elongated protruding portion 37.

A rearward-facing surface of the elongated protruding portion 37 is formed to extend gradually downward as it extends rearward. An upward-facing surface extends forward from an upper edge of the rearward-facing surface of the elongated protruding portion 37. A middle portion along the width at a rear end of the upward-facing surface is recessed downward, and the imaging device 50 is fixed to the recess. The seat 40 is attached to an upper side of the elongated protruding portion 37, that is to say, an upper side of the upward-facing surface, but the seat 40 is not illustrated in FIG. 5.

The imaging device 50 is attached to the small planing watercraft 32 through a case 52 as one example of an incorporated portion.

The case 52 is formed like a case opening in at least one direction. More specifically, the case 52 includes an attachment plate 53, a peripheral wall 54, and an attachment piece 55. The attachment plate 53 has a hole 53h. The peripheral wall 54 is formed to extend from a peripheral edge of the attachment plate 53 to one side along the thickness of the attachment plate 53. The peripheral wall 54 is formed to become gradually wider as it extends apart from the attachment plate 53. The peripheral wall 54 and the attachment plate 53 are herein formed to have a shape of a truncated pyramid obtained by cutting the top of a pyramid. A portion of the peripheral wall 54 opposing the attachment plate 53 is open. The attachment piece 55 having a plate-like shape extends from a portion of the periphery of the peripheral wall 54.

In a state of being disposed on the recess on the upper side of the rear portion of the above-mentioned elongated protruding portion 37, the attachment piece 55 is fixed by an attachment member, such as a bolt 55B. In this state, the case 52 protrudes beyond a portion surrounding the case 52 of the small planing watercraft 32. In this state, an outward-facing main surface of the attachment plate 53 faces a range behind the body 34. The case 52 is herein in a state of protruding rearward from an upper portion of the rear portion of the elongated protruding portion 37.

The seat 40 disposed on the elongated protruding portion 37 protrudes rearward from the upper portion of the rear portion of the elongated protruding portion 37. A V-shaped space opening rearward when viewed from the side is thus formed between the rear portion of the elongated protruding portion 37 and the rear portion of the seat 40 in a vertical direction. The case 52 is disposed in a valley of the V-shaped space. A portion of the rear portion of the seat 40 surrounding the case 52 from above is formed to be a V-shaped recessed groove 40V opening downward. The recessed groove 40V is formed to become gradually laterally wider as it extends rearward.

The imaging device 50 includes an imaging element, a lens, and the like. The imaging device 50 is fixed to a surface of the attachment plate 53 facing inward of the body in a state of a lens surface to capture an image facing the hole 53h. The imaging device 50 may be fixed to the attachment plate 53 with an adhesive, a screw, a hook structure, and the like. The case 52 protects a portion of the imaging device 50 other than the lens surface. A cable 56 drawn out from the imaging device 50 passes through the case 52 to be drawn out from an opening of the case 52, and passes through a hole formed in the upper portion of the elongated protruding portion 37 to be introduced into the body 34. The cable 56 is a signal transmission medium to transmit a captured image signal acquired by the imaging device 50. The cable 56 is guided into the small planing watercraft 32 and connected to an image processing device 70, which will be described below. The captured image signal acquired by the imaging device 50 may not necessarily be transmitted by wire. The imaging device 50 and the image processing device 70 may be connected through wireless communication meeting a standard such as Bluetooth®, and the captured image signal acquired by the imaging device 50 may be transmitted to the image processing device 70 through wireless communication.

As described above, the case 52 protrudes rearward beyond the upper portion of the rear portion of the elongated protruding portion 37. The case 52 also protrudes rearward beyond the back of the above-mentioned recessed groove 40V in the rear portion of the seat 40. The back of the recessed groove 40V refers to a valley of the recessed groove 40V having a maximum depth, that is to say, a front portion of the recessed groove 40V. The case 52 as a portion of the small planing watercraft 32 in which the imaging device 50 is incorporated thus protrudes rearward beyond a surrounding portion, that is, the upper portion of the rear portion of the elongated protruding portion 37 and the back of the recessed groove 40V in the rear portion of the seat 40. The imaging device 50 is incorporated in an end of the case 52 protruding from the body 34, so that the surrounding portion is less likely to appear in an imaging range of the imaging device 50.

Herein, one portion of the small planing watercraft 32 is defined as a first portion, and another portion of the small planing watercraft 32 below the first portion is defined as a second portion. The imaging device 50 is located between the first portion and the second portion described above. The imaging device 50 is also located inward of the first portion and the second portion in the fore-aft direction in a moored state. That is to say, the imaging device 50 is located between the first portion and the second portion to be retracted from leading ends of the first portion and the second portion.

In the present embodiment, the rear portion of the elongated protruding portion 37 is one example of the second portion. The rear portion of the seat 40 is one example of the first portion. The imaging device 50 is located between the rear portion of the elongated protruding portion 37 as one example of the second portion and the rear portion of the seat 40 as one example of the first portion. A lower portion of the rear portion of the elongated protruding portion 37 protrudes rearward beyond the imaging device 50. An upper portion of the rear portion of the seat 40 also protrudes rearward beyond the imaging device 50. The imaging device 50 is thus located inward of (in front of) the rear portion of the elongated protruding portion 37 and the rear portion of the seat 40 in the fore-aft direction of the small planing watercraft 32. Thus, a lower portion of the imaging device 50 is covered with the rear portion of the elongated protruding portion 37 for protection, and an upper portion of the imaging device 50 is protected by the rear portion of the seat 40.

A towing rope attachment portion 38 is disposed on the rear portion of the above-mentioned elongated protruding portion 37 below the imaging device 50. The towing rope attachment portion 38 has a shape enabling hooking of a towing rope 38R, for example, an annular shape, a U-shape, or a J-shape. A hook at an end of the towing rope 38R is hooked or directly tied to the towing rope attachment portion 38, so that the towing rope 38R is attached to the towing rope attachment portion 38. The towing rope 38R is a rope to tow a towing target floating on the water surface behind the small planing watercraft 32. An example of the towing target includes a player of wakeboarding or water skiing.

If the towing rope attachment portion is located above the imaging device, the towing rope can fall within the imaging range of the imaging device located below the towing rope attachment portion because the towing rope hangs down in a sagging state. In this case, the towing rope is likely to appear in close-up in the image captured by the imaging device 50. In contrast, if the towing rope attachment portion 38 is located below the imaging device 50, the towing rope 38R can hang down without passing through a range directly behind the imaging device 50 even in a case where the towing rope 38R sags. The towing rope 38R is thus less likely to appear in close-up in the image captured by the imaging device 50 compared with the above-mentioned case.

The towing rope attachment portion 38 may be located below the imaging device 50 apart from the imaging device 50. This makes an end of the towing rope 38R closer to the towing rope attachment portion 38 less likely to appear in the captured image. The towing rope attachment portion 38 may be located in front of the imaging device 50 in the fore-aft direction. This makes the towing rope attachment portion 38 less likely to appear in the captured image.

A storage 37T is disposed on the elongated protruding portion 37. The storage 37T is disposed on the rear portion of the elongated protruding portion 37 below the towing rope attachment portion 38. The storage 37T has an openable and closable receiving space. The towing rope 38R may be stored in the storage 37T.

A location and an orientation of the imaging device 50 relative to the small planing watercraft 32 are set in accordance with the imaging range. In the present embodiment, the imaging device 50 is set in the rear portion of the elongated protruding portion 37 to face rearward because the imaging range of imaging device 50 is a range behind the small planing watercraft 32. As one example, the imaging device 50 may be incorporated in the small planing watercraft 32 in an orientation to capture an image behind and obliquely above the small planing watercraft 32 when the small planing watercraft 32 is in the moored state (see FIG. 1). For example, the imaging device 50 may be oriented to have an optical axis L along a direction toward the image behind and obliquely above the small planing watercraft 32. The optical axis L of the imaging device 50 is a central axis of the lens, for example. The small planing watercraft 32 planes with a front portion thereof raised obliquely upward and a rear portion thereof lowered obliquely downward (see FIG. 6) compared with an orientation in the moored state. Thus, in a case where the imaging device 50 is incorporated in the small planing watercraft 32 in the orientation to capture the image behind and obliquely above the small planing watercraft 32 when the small planing watercraft 32 is in the moored state, the orientation of the imaging device 50 becomes closer to an orientation to capture an image behind the small planing watercraft 32 along a horizontal direction when the small planing watercraft 32 is in the planing state. This can cause the small planing watercraft 32 to be in a state suitable for capturing of an image of the towing target moving on the water surface behind the small planing watercraft 32 (see FIG. 6).

When the small planing watercraft 32 is in the moored state, the imaging device 50 may not necessarily be in the orientation to capture the image behind and obliquely above the small planing watercraft 32, and may be in an orientation to capture the image behind the small planing watercraft 32 along the horizontal direction, for example.

The imaging device 50 may have a property of capturing an image in a range having a wider angle in the horizontal direction than in the vertical direction when the small planing watercraft 32 is in the moored state. The property may be achieved by a detection surface of the imaging element in a landscape orientation. For example, the imaging device 50 has a horizontal angle of view θh in the horizontal direction and a vertical angle of view θv in the vertical direction around the optical axis L, and θh>θv may be satisfied. More specifically, 90°≤θh≤180° and 70°≤θv≤110° are satisfied, and θh>θv may be satisfied. The horizontal angle of view and the vertical angle of view, however, are not limited to those in the above-mentioned ranges. When the small planing watercraft 32 makes a turn while towing the towing target, the towing target can be displaced from a range directly behind the small planing watercraft 32 by being swung to the left or to the right. In such a case, the towing target can be continued to fall within the imaging range when the imaging device 50 has a large horizontal angle of view θh. On the other hand, the small planing watercraft 32 tilts in a pitch direction upon planing, but an angle of tilt is considered to be obviously smaller than an angle at which the towing target is swung to the left or to the right relative to the small planing watercraft 32. The towing target can thus be continued to fall within the imaging range even when the vertical angle of view θv is smaller than the horizontal angle of view θh.

The imaging device 50 may be incorporated in the small planing watercraft 32 at a location and in an orientation enabling capturing of an image of at least part of the body 34 of the small planing watercraft 32. In the present embodiment, a lower boundary of the horizontal angle of view θh of the imaging device 50 is set to pass through the rearmost portion of the deck 36 of the body 34. The rearmost portion of the deck 36 thus appears in the imaging range of the imaging device 50 (see FIG. 6). This can cause the display device 60 to display the image of surroundings and the deck 36, and makes it easy for the operator P viewing the display to understand a sense of distance and a positional relationship between a subject in the image of surroundings and the small planing watercraft 32.

The above-mentioned rearmost portion of the deck 36 is the rear floor 36*d* on which baggage is mountable. In a case where the baggage is mounted on the rear floor 36*d*, the imaging device 50 can capture an image of the baggage on the rear floor 36*d*.

The image captured by the imaging device 50 is displayed by the display device 60. The display device 60 is incorporated at the location where the display device 60 is recognizable by the operator P. The operator P can thus easily recognize the image captured by the imaging device 50 during operation. The image captured by the imaging device 50 may be inverted vertically or horizontally with respect to a center line of the image as necessary, and displayed by the display device 60.

Figure 6:
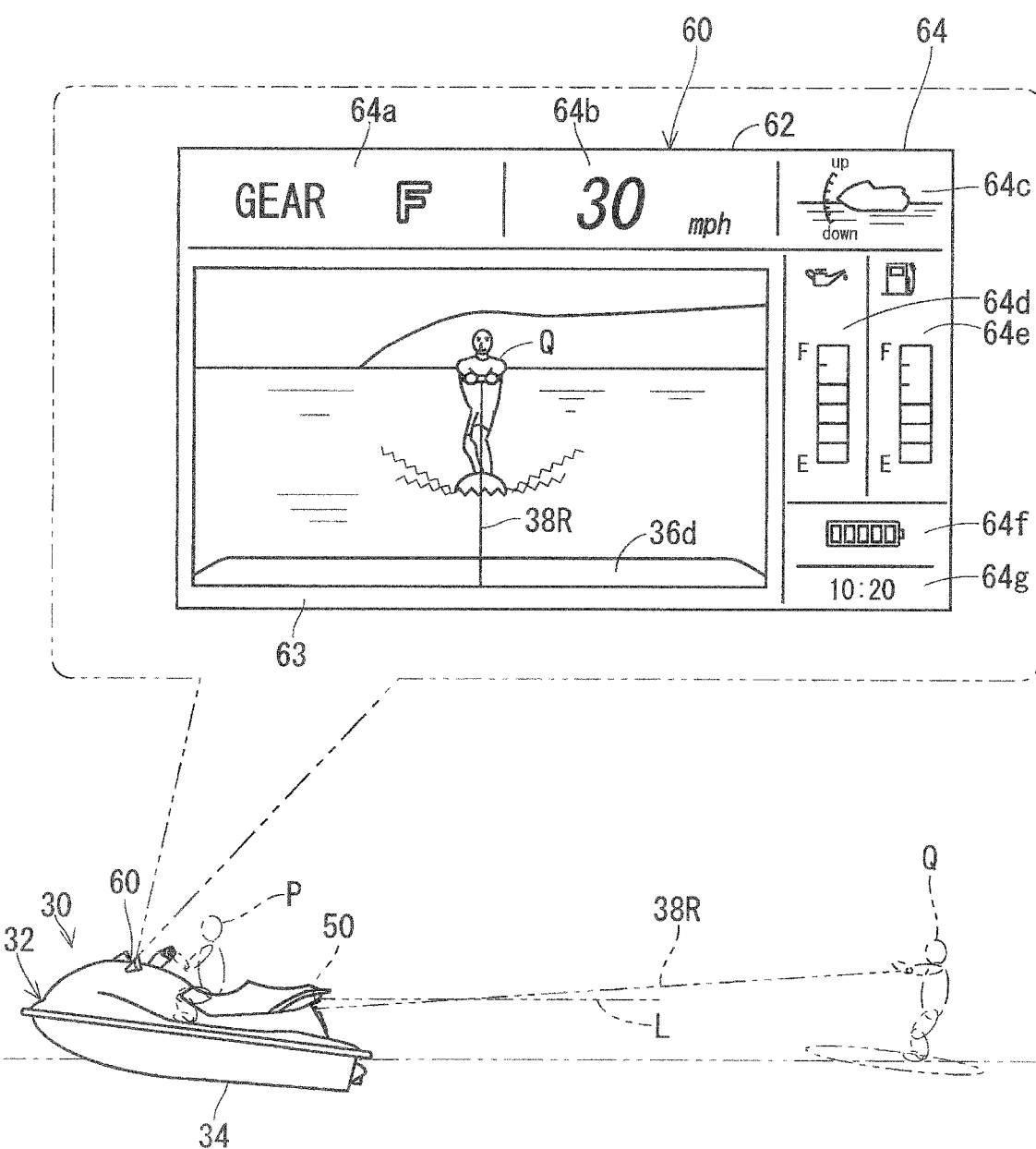
FIG. 6 illustrates an example of display during towing.

FIG. 6 illustrates an example of display in a state of the small planing watercraft 32 towing a towed object. FIG. 6 illustrates a state of the small planing watercraft 32 towing a player Q of wakeboarding or water skiing as the towed object.

As described above, the display device 60 is disposed in front of the operator P. A display screen 62 of the display device 60 includes a captured image display region 63. The captured image display region 63 is a region to display the image captured by the imaging device 50. The imaging device 50 may capture a still image or a moving image as the captured image. The display device 60 may display the still image or the moving image. The image displayed in the captured image display region 63 may be all or part of the image captured by the imaging device 50. In a case where the display device 60 displays the still image, the surrounding conditions are visible to the operator P in real time if still images are sequentially updated.

In the present embodiment, the display device 60 includes a gauge display region 64. The gauge display region 64 includes a gear position display region 64*a*, a speed display region 64*b*, a trim angle display region 64*c*, an oil level display region 64*d*, a fuel level display region 64*e*, and a battery level display region 64*f*. The captured image display region 63 is the largest region including a central portion of the display screen 62. The gear position display region 64*a*, the speed display region 64*b*, the trim angle display region 64*c*, the oil level display region 64*d*, the fuel level display region 64*e*, and the battery level display region 64*f* are regions arranged outside the captured image display region 63 and each being smaller than the captured image display region 63. The gear position display region 64*a*, the speed display region 64*b*, and the trim angle display region 64*c* are herein arranged horizontally from left to right above the captured image display region 63. To the right of the captured image display region 63, the oil level display region 64*d* and the fuel level display region 64*e* are arranged side by side, and the battery level display region 64*f* is disposed below the oil level display region 64*d* and the fuel level display region 64*e*. A clock display region 64*g* is disposed below the battery level display region 64*f*, but the clock display region 64*g* may not necessarily be disposed.

The gear position display region 64*a* is a portion to display a gear position of the small planing watercraft 32, such as a forward movement position, a stopping position, and a rearward movement position. The speed display region 64*b* is a region to display a sailing speed of the small planing watercraft 32. The trim angle display region 64*c* is a region to display a trim angle of the small planing watercraft 32. The oil level display region 64*d* is a region to display a level of engine oil in the internal combustion engine. The fuel level display region 64*e* is a region to display a level of fuel (e.g., gasoline) for sailing driving in the internal combustion engine, and the battery level display region 64*f* is a region to display a level of battery to drive auxiliary electrical equipment to operate the internal combustion engine.

The regions are not limited to those in the above-mentioned example, and the display device 60 may include only the captured image display region 63. In a case where the display device 60 includes the gauge display region 64, it is not required to include all the above-mentioned regions 64*a* to 64*f*. The display device 60 may include some of the regions 64*a* to 64*f*. In this case, the display device 60 may include at least one of the oil level display region 64*d*, the fuel level display region 64*e*, and the battery level display region 64*f*.

Information displayed by the display device 60 is not limited to that in the above-mentioned example. The display device 60 may display rpm of the internal combustion engine, the temperature of a coolant for the internal combustion engine, the temperature of the water surface on which the small planing watercraft 32 sails, outside air temperature, and the like.

FIG. 7 is a block diagram showing an electrical configuration of the small planing watercraft with the imaging device 30. The image processing device 70 is incorporated in the small planing watercraft 32. The image processing device 70 is configured by a typical microcomputer including a CPU 71 as a processor, ROM, RAM, and the like. The image processing device 70 performs arithmetic operation in accordance with procedures described in a software program stored in advance. The image processing device 70 includes a storage device 72. The storage device 72 is configured by nonvolatile memory, such as flash memory. A display program 72a as a software program is stored in the storage device 72. The storage device 72 can store captured image data 72b acquired through the imaging device 50.

The imaging device 50 is connected to the image processing device 70 to be capable of transmitting a captured image signal. The image processing device 70 is connected to the display device 60 to be capable of transmitting a display signal. The image processing device 70 performs processing to cause the display device 60 to display the captured image based on the captured image data acquired by the imaging device 50.

A global positioning system (GPS) receiver 75 to receive a GPS signal may be incorporated in the small planing watercraft 32, and connected to the image processing device 70 to be capable of transmitting the GPS signal. In this case, the image processing device 70 can identify the location of the small planing watercraft 32 based on the GPS signal.

The small planing watercraft 32 may include an operation receiving unit 76 to input various instructions to the image processing device 70, and the operation receiving unit 76 may be connected to the image processing device 70 to be capable of inputting various instructions. The operation receiving unit 76 may be a switch 76a (see FIG. 2) disposed around the display device 60, for example. The operation receiving unit 76 may be a switch disposed around the handle 44. The operation receiving unit 76 may be a touch panel incorporated in the display device 60.

A sensor and the like to detect various states of the small planing watercraft 32 may be connected to the image processing device 70. For example, a speed detection unit 80, a trim detection unit 81, a fuel level detection unit 82, an oil level detection unit 83, and a battery level detection unit 84 may be connected to the image processing device 70. The speed detection unit 80 is a sensor to detect a speed of the small planing watercraft 32, and is, for example, a sensor to measure a pulley fixed to the body and the number of rotations of the pulley. The speed of the small planing watercraft 32 may be obtained, for example, by an acceleration sensor or based on the GPS signal. The trim detection unit 81 is a sensor to detect the trim angle of the small planing watercraft 32, and is, for example, a gyroscope sensor. The fuel level detection unit 82 is a sensor to detect the level of the fuel (e.g., gasoline) for sailing driving in the internal combustion engine, and the oil level detection unit 83 is a sensor to detect the level of the engine oil in the internal combustion engine. The fuel level detection unit 82 and the oil level detection unit 83 may be various sensors to detect the amount of liquid, for example, sensors to detect the level based on a location of a floating body in accordance with the location of a liquid surface. The battery level detection unit 84 is a sensor to detect the level of the battery. The battery level detection unit 84 is, for example, a sensor to detect a value of a voltage of the battery, and the image processing device 70 may obtain the level of the battery based on the voltage of the battery.

A lever or a switch for rearward movement and a lever or a switch for stopping are disposed on the small planing watercraft 32, and such levers and switches may also be connected to the image processing device 70.

The imaging device 50 is connected to the image processing device 70, and thus the image signal can be generated so that the image captured by the imaging device 50 is displayed in the captured image display region 63 of the display screen 62 of the display device 60. The speed detection unit 80, the trim detection unit 81, the fuel level detection unit 82, the oil level detection unit 83, the battery level detection unit 84, and the lever or the switch for rearward movement or stopping are also connected to the image processing device 70. The image processing device 70 can thus display information in accordance with detection states of the detection units 80 to 84 and an operation state of the lever or the switch in the gauge display region 64 (the gear position display region 64a, the speed display region 64b, the trim angle display region 64c, the oil level display region 64d, the fuel level display region 64e, and the battery level display region 64f) of the display screen 62 of the display device 60.

The image processing device 70 may store at least one of the still image and the moving image captured by the imaging device 50 in the storage device 72 as an image storage device. The captured image data 72b stored in the storage device 72 may be transferred to an external terminal device through wired communication or wireless communication (e.g., Bluetooth® communication).

The storage device for storing at least one of the still image and the moving image captured by the imaging device 50 is not required to be the same as the storage device 72 for storing the display program 72a. For example, the image processing device 70 may have a memory card slot to which an external nonvolatile recording medium, such as flash memory, is detachably attachable, and at least one of the still image and the moving image captured by the imaging device 50 may be recorded on the external nonvolatile recording medium.

Location data based on the GPS signal may be associated with the captured image data 72b. In a case where the captured image data 72b is still image data, for example, GPS location information of the small planing watercraft 32 at a time point when the still image data has been captured may be included. In a case where the captured image data 72b is moving image data, for example, GPS log data with which a moving location of the small planing watercraft 32 is associated for time of the moving image data may be stored.

In the present embodiment, a combination of the imaging device 50 and the display device 60 is a surrounding image imaging device for a small planing watercraft 90. The surrounding image imaging device for the small planing watercraft 90 may further include the image processing device 70.

According to the small planing watercraft with the imaging device 30 and the surrounding image imaging device for the small planing watercraft 90 each having such a configuration, the image of surroundings captured by the imaging device 50 is displayed by the display device 60. The operator P of the small planing watercraft 32 can view the image of surroundings through the display device 60. The operator P can thereby easily understand the surrounding conditions during sailing of the small planing watercraft 32.

When the display device 60 displays at least one of fuel level display information (see the fuel level display region 64e), oil level information (see the oil level display region 64d), and battery level information (see the battery level display region 64f), the operator P can simultaneously recognize conditions of the small planing watercraft 32 and the surrounding conditions by only viewing the display device 60.

When the imaging device 50 captures the image including the range to be the blind area G, and the display device 60 displays the image including the range to be the blind area G, the operator P can more easily view the range to be the blind area G.

Especially when the imaging device 50 captures the image behind the small planing watercraft 32, and the display device 60 displays the image behind the small planing watercraft 32, the image behind the small planing watercraft 32 that is less visible during sailing of the small planing watercraft 32 can easily be viewed by the operator P.

In a case where the imaging device 50 faces obliquely upward when the small planing watercraft 32 is in the moored state, the orientation of the imaging device 50 becomes closer to an orientation to capture an image in a wide range on the water surface when the small planing watercraft 32 is oriented to face obliquely upward and forward by planing. This can cause the imaging device 50 to capture an image in a laterally wide range behind the small planing watercraft 32 during planing of the small planing watercraft 32, and the display device 60 can display the captured image. This makes the laterally wide range behind the small planing watercraft 32 visible to the operator P during sailing of the small planing watercraft 32.

When the imaging device 50 has an angle of view wider in the horizontal direction than in the vertical direction, the imaging device 50 and the display device 60 make the laterally wider range visible to the operator P during planing of the small planing watercraft 32.

When at least part of the small planing watercraft 32 appears in the image captured by the imaging device 50, the operator P can view the image of surroundings together with the image of the at least part of the small planing watercraft 32. This makes it easy for the operator P to understand the sense of distance and the positional relationship between the subject in the image of surroundings and the small planing watercraft 32. When the small planing watercraft 32 moves rearward or passes through a narrow region, for example, the operator P can perform operation while identifying the positional relationship between the subject and the small planing watercraft 32 appearing in the image of surroundings.

When the rear floor 36*d* on which the baggage is mountable appears in the image captured by the imaging device 50, mounting conditions can be identified through the display device 60 in a case where any baggage is mounted on the rear floor 36*d*. Especially because the rear floor 36*d* is located behind the elongated protruding portion 37 and is directly less-visible to the operator P, identification of the mounting conditions of the baggage on the rear floor 36*d* during operation is effective.

The imaging device 50 is located above the towing rope attachment portion 38, so that the towing rope 38R is less likely to appear in close-up in the image captured by the imaging device 50 even if the towing rope 38R sags. The surrounding conditions can thus easily be understood.

The imaging device 50 is located inward in the fore-aft direction between the rear end of the seat 40 as the first portion and the lower portion of the rear portion of the elongated protruding portion 37 as the second portion. The imaging device 50 is thus less likely to be physically impacted, for example, by being hit by an object.

The imaging device 50 is attached to the rear end of the case 52, and is located to protrude rearward beyond portions of the elongated protruding portion 37 and the seat 40 surrounding the case 52. A portion of the small planing watercraft is thus less likely to appear, and the image of surroundings in a wide range can be captured near the imaging device 50.

At least one of the still image and the moving image captured by the imaging device 50 is stored in the storage device 72, and thus surrounding conditions during sailing can be left as data.

Various modifications based on the above-mentioned embodiment will be described.

As a first modification, an example of the small planing watercraft with the imaging device 30 in which the image of surroundings displayed by the display device 60 changes depending on a heading direction of the small planing watercraft 32 will be described. The change of the image of surroundings includes, for example, at least upward, downward, leftward, or rightward shift of the image of surroundings displayed by the display device 60 and contraction or expansion of a range of the image of surroundings displayed by the display device 60.

For example, a case where a display range of the image captured by the imaging device 50 to be displayed by the display device 60 is changed and a case where the orientation of the imaging device 50 is changed so that the imaging device 50 oscillates at least horizontally or vertically are considered as examples of the change of the image of surroundings displayed by the display device 60. The former example will be described first.

Figure 8:
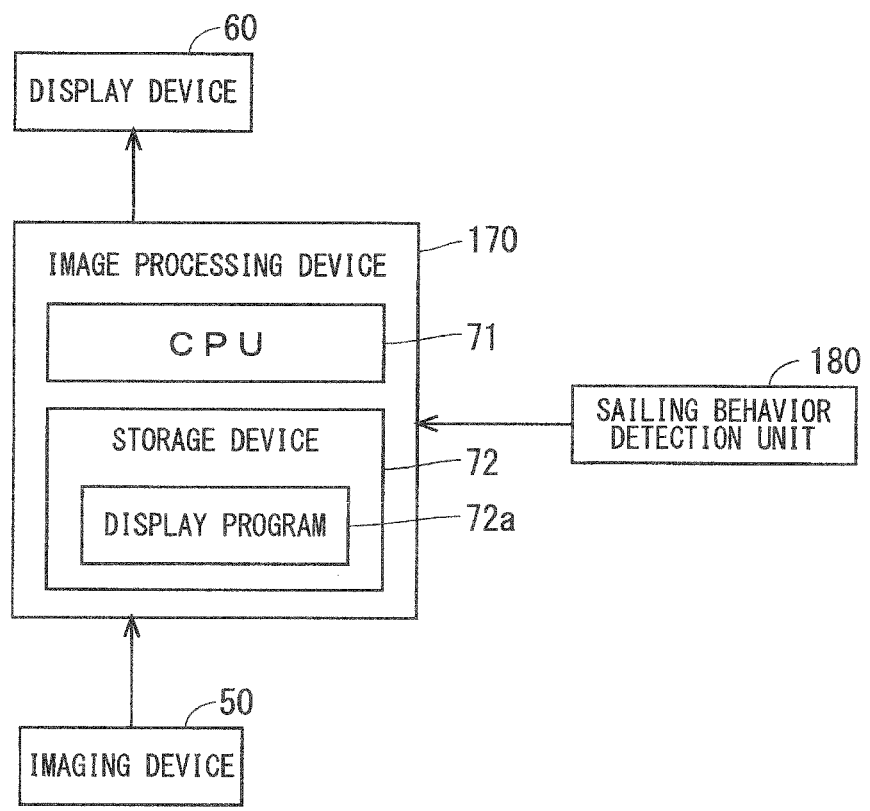
FIG. 8 is a block diagram showing an electrical configuration of a small planing watercraft with an imaging device according to a first modification.
Figure 9:
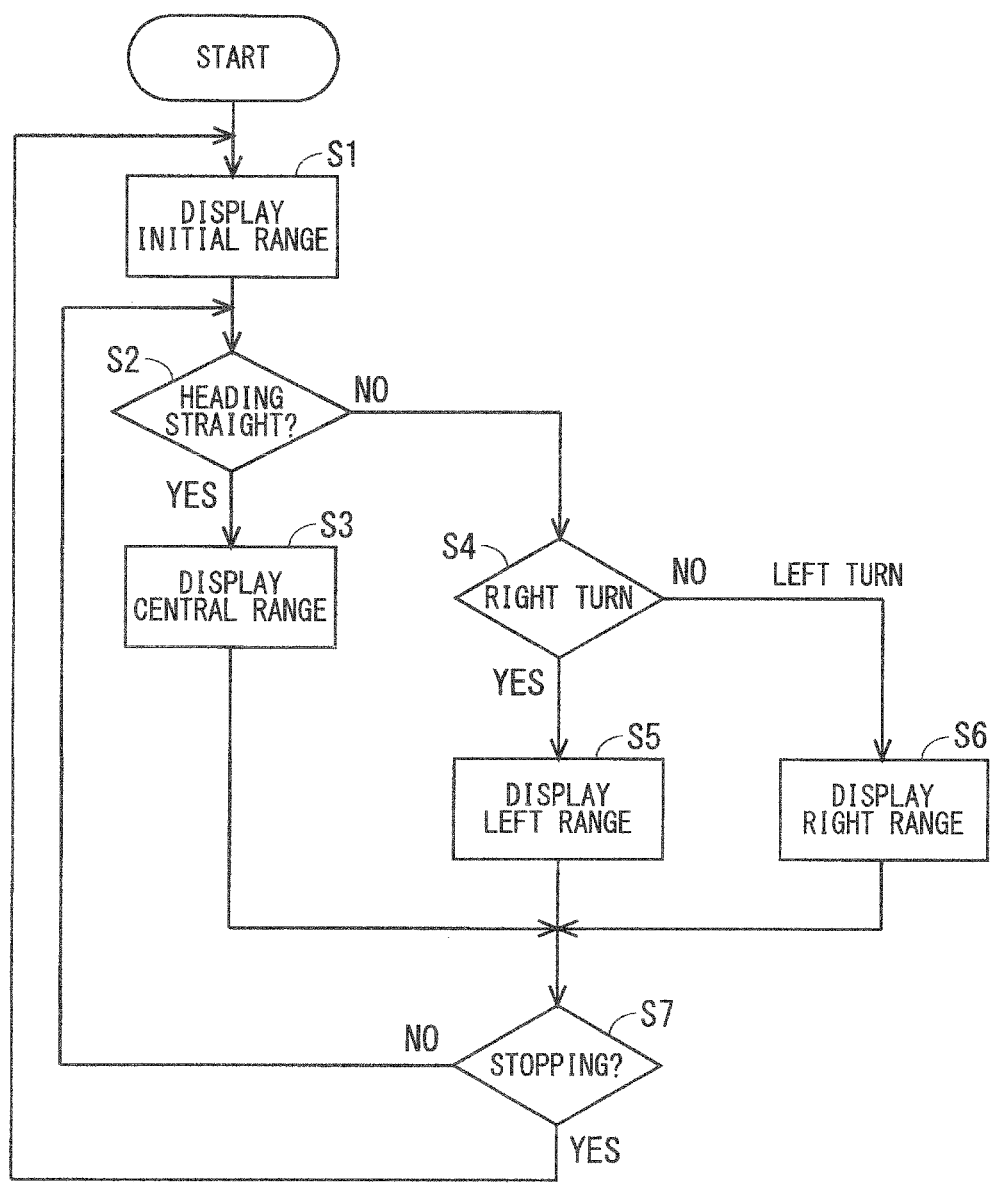
FIG. 9 is a flowchart showing an example of processing performed by an image processing device according to the above-mentioned modification.
Figure 10:
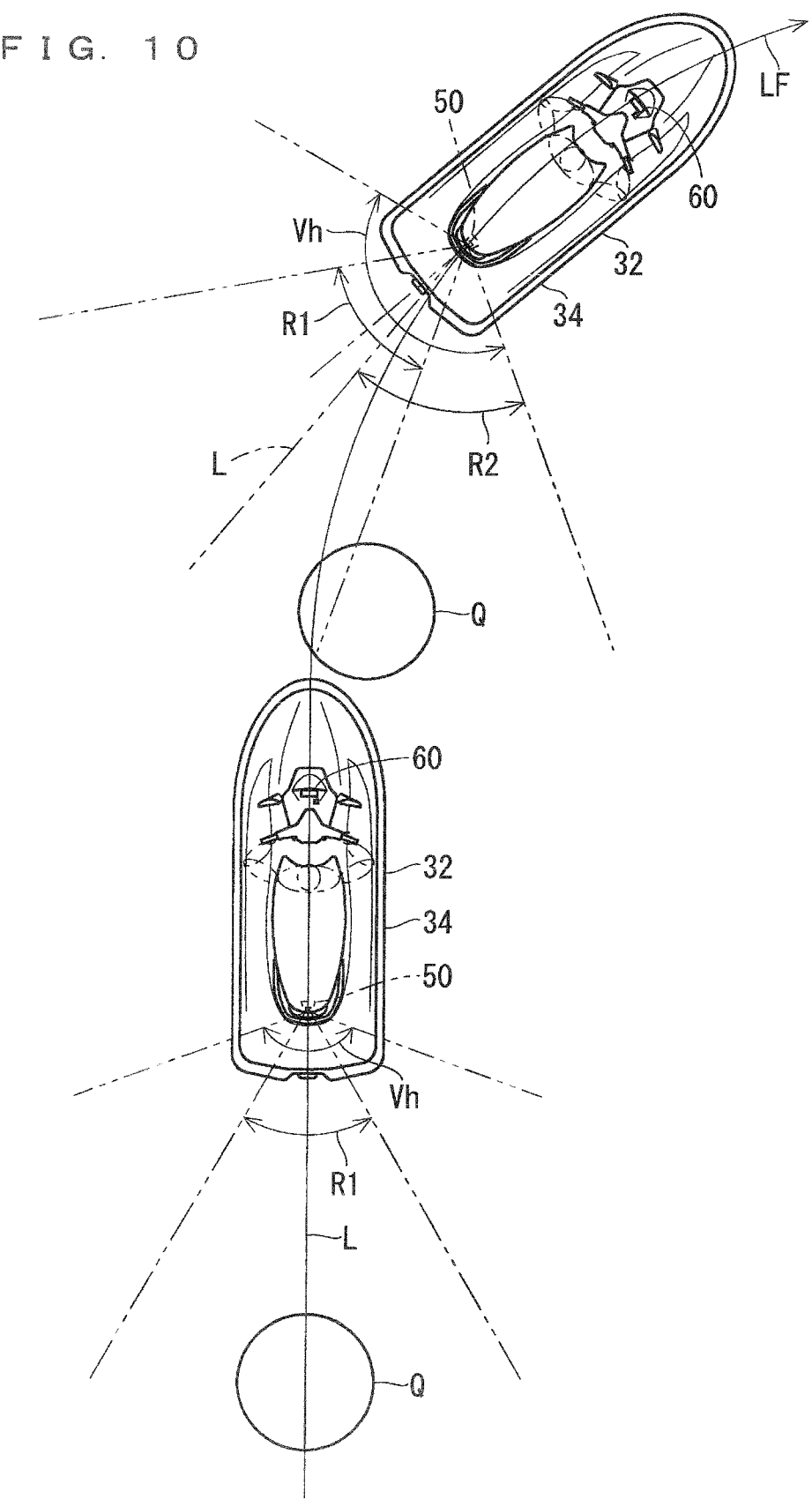
FIG. 10 illustrates a display range according to the above-mentioned modification.

FIG. 8 is a block diagram showing an electrical configuration of a small planing watercraft with an imaging device according to the first modification. FIG. 9 is a flowchart showing an example of processing performed by an image processing device 170 according to the modification. FIG. 10 illustrates the display range according to the modification.

In this example, the image processing device 170 corresponding to the above-mentioned image processing device 70 performs processing to control the display range of the image of surroundings to be displayed by the display device 60. A sailing behavior detection unit 180 is connected to the image processing device 170. The sailing behavior detection unit 180 is a sensor to detect a sailing behavior of the small planing watercraft 32, for example, a behavior related to the heading direction, such as a right turn and a left turn. The sailing behavior detection unit 180 may be a rudder angle sensor to detect a rudder angle of the handle 44. The sailing behavior detection unit 180 may be a gyroscope sensor to detect a yaw angular velocity of the body 34. A result of detection by the sailing behavior detection unit 180 is input into the image processing device 170, and, based on the result of detection, the image processing device 170 can determine where the small planing watercraft 32 is heading straight, making a right turn, or making a left turn. In a case where the sailing behavior detection unit 180 is the rudder angle sensor, for example, it may be determined that a right turn is being made when a steering angle to make a right turn exceeds or becomes equal to or greater than a predetermined reference right rudder angle, that a left turn is being made when a steering angle to make a left turn exceeds or becomes equal to or greater than a predetermined reference left rudder angle, and that the small planing watercraft 32 is heading straight when the steering angle is between the reference right rudder angle and the reference left rudder angle.

As for an example of processing performed by the image processing device 170, after the start of sailing, the image processing device 170 causes the display device 60 to display an image in an initial range in a step S1 as shown in FIG. 9. The initial range is, for example, a range having a center of the image captured by the imaging device 50 as a center of the displayed image. The initial range in the step S1 may be the same as a central range in a step S3. The initial range may be larger than the central range in the step S3.

In the next step S2, the image processing device 170 determines whether the small planing watercraft 32 is heading straight based on the result of detection by the sailing behavior detection unit 180. When it is determined that the small planing watercraft 32 is heading straight, processing proceeds to the step S3.

In the step S3, the image processing device 170 causes the display device 60 to display an image in the central range along the width of the image captured by the imaging device 50. As illustrated in FIG. 10, when the small planing watercraft 32 is heading straight, the player Q is more likely to be located behind the small planing watercraft 32 unless the player Q intentionally makes a turn. The display device 60 is thus caused to display the image in the central range along the width of the image captured by the imaging device 50. A display range R1 in this case is shown in FIG. 10, and the player Q is located within the display range R1. Referring back to FIG. 9, processing then returns to the step S2. In FIG. 10, the location of the player Q is indicated by circles. A route is indicated by a line LF. After processing in the step S3, processing proceeds to a step S7.

When it is determined that the small planing watercraft 32 is not heading straight in the step S2, processing proceeds to a step S4. In the step S4, the image processing device 170 determines whether the small planing watercraft 32 is making a right turn based on the result of detection by the sailing behavior detection unit 180. When it is determined that a right turn is being made, processing proceeds to the step S5.

In the step S5, the image processing device 170 causes the display device 60 to display an image in a left range of the image captured by the imaging device 50 (i.e., a range obliquely to the right of and behind the small planing watercraft 32). As illustrated in FIG. 10, when the small planing watercraft 32 is making a right turn, the player Q is more likely to be located to the right of the range directly behind the small planing watercraft 32 unless the player Q intentionally makes a turn because the player Q continues to head straight by inertia. When the image in the above-mentioned central range is continued to be displayed, the player Q is biased toward a boundary on one side or outside the one side of the display range R1. This can make it difficult to cause the player Q as a whole to appear in the image displayed by the display device 60. The display device 60 is thus caused to display the image in the left range of the image captured by the imaging device 50. A display range R2 in this case is shown in FIG. 10, and the player Q is located within the display range R2. The display device 60 thereby displays the player Q as a whole. Referring back to FIG. 9, processing proceeds to the step S7 after processing in the step S5.

When it is determined that a right turn is not being made in the step S4, processing proceeds to a step S6. When it is determined that the small planing watercraft 34 is not heading straight in the step S2 and it is determined the small planing watercraft 34 is not making a right turn in the step S4 during sailing of the small planing watercraft 32, the small planing watercraft 32 is making a left turn. In the step S6, the image processing device 170 causes the display device 60 to display an image in a right range of the image captured by the imaging device 50 (i.e., a range obliquely to the left of and behind the small planing watercraft 32). The display device 60 thereby displays an image in which the player Q appears as in a case of a right turn. Processing then proceeds to the step S7.

In the step S7, the image processing device 170 determines whether the small planing watercraft 32 is stopping. Based on a speed signal output from the speed detection unit 80 (see FIG. 7), for example, it may be determined that the small planing watercraft 32 is stopping when the speed is 0 or when the speed becomes equal to or lower than or falls below a predetermined reference value. It may be determined whether the small planing watercraft 32 is stopping based on an output of a GPS sensor, an acceleration sensor, a gear position sensor, and the like.

Processing returns to the step S1 when it is determined that the small planing watercraft 32 is stopping in the step S7, and returns to the step S2 when it is determined that the small planing watercraft 32 is not stopping (i.e., is sailing).

An example of processing performed in a case where the small planing watercraft 32 is moving rearward will be described below.

For example, a sensor to detect the trim angle of the small planing watercraft 32, such as the gyroscope sensor, may be used as the sailing behavior detection unit 180 to change a range of the image displayed by the display device 60 based on the captured image upward or downward in accordance with the trim angle of the small planing watercraft 32. For example, the display range in the planing state may be at a higher location than the display range in the moored state.

According to the present modification, the display range of the image of surroundings to be displayed by the display device 60 changes depending on the sailing behavior of the small planing watercraft 32, so that the display device 60 displays an image capturing target (e.g., the player Q of wakeboarding or water skiing) in accordance with the sailing behavior to follow movement of the image capturing target while zooming in the image displayed by the display device 60.

In the present modification, the display range of the display device 60 may change continuously or in steps in accordance with a degree of a turn made by the small planing watercraft 32. For example, an equation to calculate a shift amount proportional to the steering angle of the handle 44 may be described in a program, and the display range of the display device 60 may be shifted to the right or left by the amount proportional to the steering angle in accordance with a result of calculation based on the equation. Alternatively, a table in which a plurality of ranges into which the steering angle of the handle 44 is divided are associated with shift amounts may be stored in the storage device 72, a shift amount of the display range may be obtained from the detected steering angle based on the table, and the display range of the display device 60 may be shifted to the right or left by the amount proportional to the steering angle based on the shift amount.

An example in which the image of surroundings changes depending on the sailing behavior has been described above, but the display range of the image of surroundings may be controlled to change regardless of the sailing behavior. In a case where the location of the image capturing target relative to the small planing watercraft 32 changes, for example, the display range of the image of surroundings to be displayed by the display device 60 may change in accordance with the location of the image capturing target. For example, the image processing device 70 may perform image extraction processing based on the captured image to perform face recognition on a player of wakeboarding or water skiing to thereby recognize the location of the player in the captured image. The display range of the image of surroundings to be displayed by the display device 60 may be changed so that a face of the player is located at the center of the image displayed by the display device 60.

Control of the display range of the image of surroundings to be displayed by the display device 60 may refer to a change in size of a region of the image captured by the imaging device 50 to be displayed by the display device 60. For example, the display device 60 may display the image captured by the imaging device 50 after a display magnification thereof is changed. More specifically, in a case where the distance of the image capturing target from the small planing watercraft 32 changes, for example, a magnification of the image of surroundings displayed by the display device 60 may be changed in accordance with the distance of the image capturing target. For example, the image processing device 70 may perform image extraction processing based on the captured image to perform face recognition on the player of wakeboarding or water skiing to thereby detect the distance from the small planing watercraft 32 to the player based on a size of the face. Alternatively, an optical distance sensor may be used to detect the distance from the small planing watercraft 32 to the player. The display device 60 may display the image captured by the imaging device 50 after the display magnification thereof is changed based on the distance. For example, an image in a wider range may be displayed as the captured image as the distance from the small planing watercraft 32 to the player decreases, and an image in a range enlarged by increasing the magnification may be displayed as the captured image as the distance increases.

The display range may be changed as described above not only during forward movement but also during stopping of the small planing watercraft 32.

An example of image processing performed by the image processing device 170 is not limited to the above-mentioned example. For example, an image having brightness, saturation, and the like processed in accordance with brightness of surroundings and the like may be displayed by the imaging device 50 for ease of viewing of the displayed image.

Figure 11:
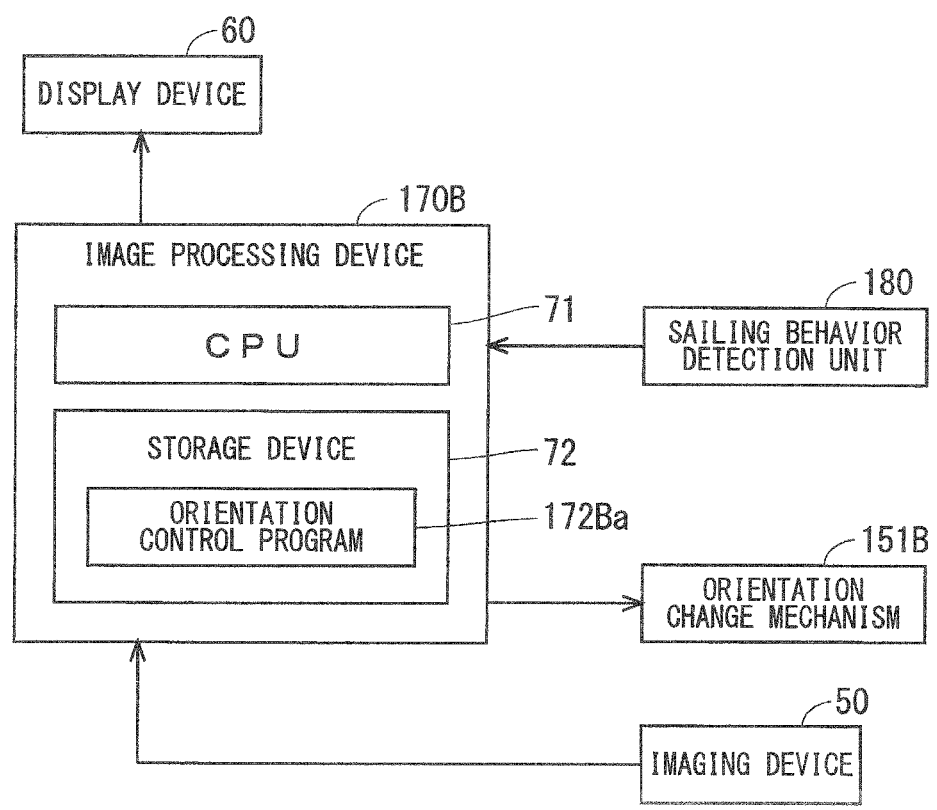
FIG. 11 is a block diagram showing an electrical configuration in a case where an orientation of the imaging device is changed in the above-mentioned modification.

An example in which the orientation of the imaging device 50 is changed so that the imaging device 50 oscillates horizontally will be described. FIG. 11 is a block diagram showing an electrical configuration in a case where the orientation of the imaging device 50 is changed. In this case, the imaging device 50 is supported by the small planing watercraft 32 through an orientation change mechanism 151B. The orientation change mechanism 151B includes an actuator (herein, a motor) capable of controlling rotation in both forward and reverse directions, for example, and supports the imaging device 50 so that the imaging device 50 can rotate around an axis along the vertical direction. A drive force of the actuator is transferred to the imaging device 50 directly or through a drive force transfer mechanism, such as a gear. Through driving of the orientation change mechanism 151B, the imaging device 50 is supported so that the imaging device 50 can be driven in both directions around the axis along the vertical direction.

The orientation change mechanism 151B is connected to an image processing device 170B corresponding to the image processing device 70, and controls the orientation of the imaging device 50 based on an instruction of the image processing device 170B. The image processing device 170B stores an orientation control program 172Ba. The orientation control program 172Ba may cause the imaging device 50 to face directly rearward in the step S3, face obliquely rightward and rearward in the step S5, and face obliquely leftward and rearward in the step S7 in the flow (see FIG. 9) following the above-mentioned display program 72a.

The orientation of the imaging device may be changed in accordance with a recognized location of the player.

A case where the imaging device 50 captures an image behind the small planing watercraft 32 has been described in the above-mentioned example. The imaging device 50 may capture an image in front of the small planing watercraft 32. For example, the imaging device 50 may capture an image in front of and below the small planing watercraft 32 that is less-visible to the operator P. In this case, the display range of the display device 60 may be a range directly in front of the small planing watercraft 32 when the small planing watercraft 32 is heading straight. In a case where the small planing watercraft 32 makes a right turn, for example, the display device 60 should display an image obliquely to the right of and in front of the small planing watercraft 32. In a case where the small planing watercraft 32 makes a left turn, for example, the display device 60 should display an image obliquely to the left of and in front of the small planing watercraft 32. As described above, the display range of the display device 60 may be changed by changing a range of the imaging range of the imaging device 50 to be displayed by the display device 60 horizontally or by changing the orientation of the imaging device 50 horizontally. The same applies to description below.

According to this example, the display device 60 displays the image of surroundings obliquely to the right of and in front of the small planing watercraft 32 in a case where a right turn is made, and displays the image of surroundings obliquely to the left of and in front of the small planing watercraft 32 in a case where a left turn is made, for example, in accordance with the heading direction of the small planing watercraft 32. The operator P can thereby easily recognize the image of surrounding in accordance with the heading direction.

A case where the small planing watercraft 32 is moving forward or stopping has been described in the above-mentioned example. The display range of the display device 60 may be changed also in a case where the small planing watercraft 32 is moving rearward.

In a case where the imaging device 50 captures an image behind the small planing watercraft 32, for example, the display device 60 should display an image obliquely to the left of and behind the small planing watercraft 32 when the small planing watercraft 32 makes a left turn rearward (the small planing watercraft 32 moves toward a range behind port). When the small planing watercraft 32 makes a right turn (the small planing watercraft 32 moves toward a range behind starboard), for example, the display device 60 should display an image obliquely to the right of and behind the small planing watercraft 32. The operator P can thereby easily recognize the image of surroundings in a direction of rearward movement.

In a case where the imaging device 50 captures an image in front of the small planing watercraft 32, for example, the display device 60 should display an image obliquely to the left of and in front of the small planing watercraft 32 when the small planing watercraft 32 makes a left turn rearward (the small planing watercraft 32 moves toward the range behind the port). When the small planing watercraft 32 makes a right turn rearward (the small planing watercraft 32 moves toward the range behind the starboard), for example, the display device 60 should display an image obliquely to the right of and in front of the small planing watercraft 32. The operator P can thereby easily recognize a side to make a turn relative to the direction of rearward movement of the small planing watercraft 32 moving rearward.

As for rearward movement, there are two types of watercrafts, namely, a watercraft making a right turn rearward when the handle 44 is turned to the right and a watercraft making a right turn rearward when the handle 44 is turned to the left. In a case of the former type, in a case where the display range of the captured image is changed or the orientation of the imaging device 50 is changed in accordance with an angle of the handle 44, the display range should be shifted to the right or the orientation of the imaging device 50 should be changed to the right when the handle 44 is turned to the right, and the display range should be shifted to the left or the orientation of the imaging device 50 should be changed to the left when the handle 44 is turned to the left. In a case of the latter type, in contrast to the former type, the display range should be shifted to the left or the orientation of the imaging device 50 should be changed to the left when the handle 44 is turned to the right, and the display range should be shifted to the right or the orientation of the imaging device 50 should be changed to the right when the handle 44 is turned to the left.

In the present modification, the amount of change of the display range of the captured image and an angle of the change of the orientation of the imaging device 50 may be determined in accordance with at least one of a degree of the turn of the small planing watercraft 32 (e.g., the angle of the handle 44) and the speed of the small planing watercraft 32. For example, the amount of change of the display range of the captured image and the angle of the change of the orientation of the imaging device 50 may increase with increasing angle of the handle 44. The amount of change of the display range of the captured image and the angle of the change of the orientation of the imaging device 50 may increase with increasing speed.

The display range of the display device 60 may be adjusted vertically. Vertical adjustment can be achieved by adjusting the range of the image captured by the imaging device 50 to be displayed by the display device 60 vertically or changing the orientation of the imaging device 50 so that the imaging device 50 oscillates vertically as described above.

The small planing watercraft 32 is oriented upward as the speed of the small planing watercraft 32 increases, and thus the imaging device 50 to capture an image behind the small planing watercraft 32 may be oriented upward or the display range of the captured image behind the small planing watercraft 32 may be shifted upward to display an image at a farther location. In this case, a focal length may be changed in accordance with the change of the display range of the display device 60. For example, the focal length may be set to increase as the display range of the display device 60 is shifted upward because an image at a farther location is to be observed. In a case where the imaging device 50 has an optical telescopic function, the magnification may be changed in accordance with a distance to the image capturing target.

Figure 13:
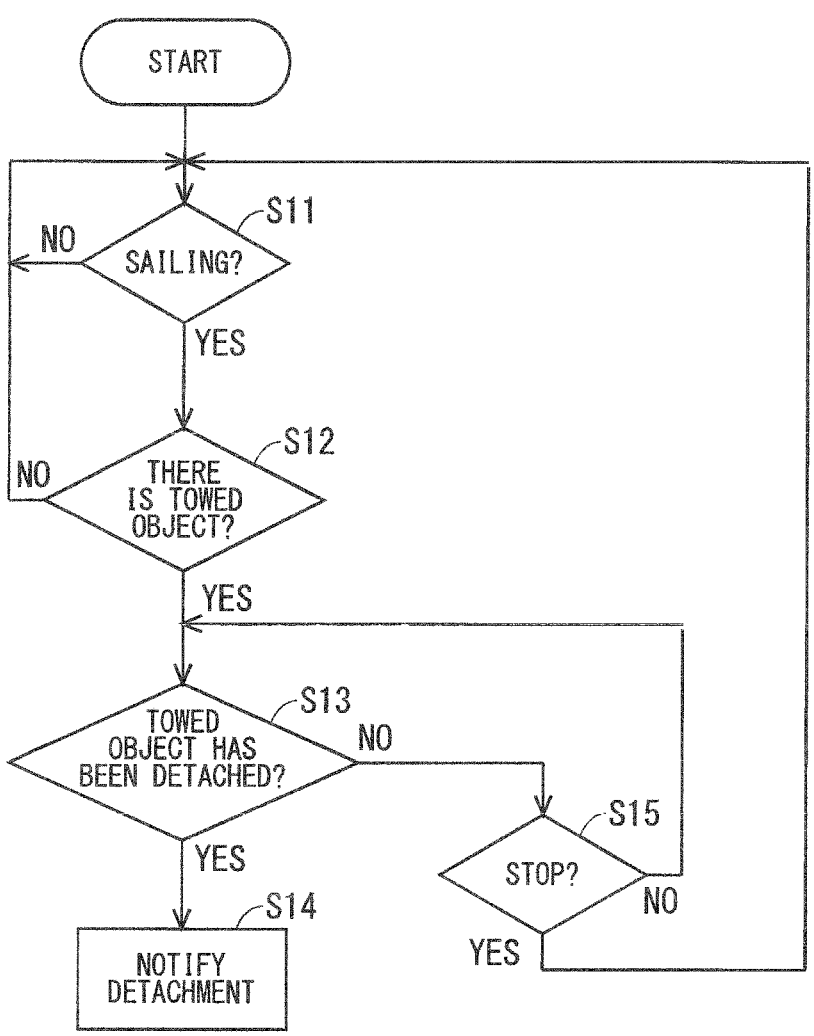
FIG. 13 is a flowchart showing an example of processing performed by an image processing device according to the above-mentioned modification.
Figure 14:
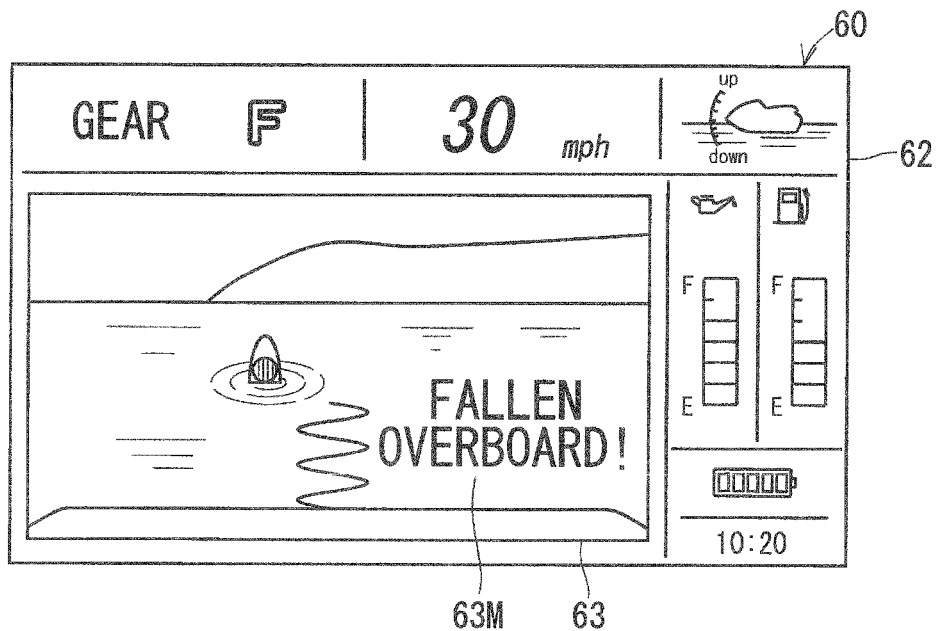
FIG. 14 illustrates an example of display of a display device according to the above-mentioned modification.

FIG. 12 is a block diagram showing an electrical configuration of a small planing watercraft with an imaging device according to a second modification. FIG. 13 is a flowchart showing an example of processing performed by an image processing device 270 according to the modification. FIG. 14 illustrates an example of display of the display device 60 according to the modification.

In the present modification, the imaging device 50 captures an image for determining whether part or all of the towed object has been detached from the small planing watercraft 32. The imaging range of the imaging device 50 may be the same as the range described in the above-mentioned embodiment. That is to say, the imaging device 50 should capture an image behind the small planing watercraft 32 to capture an image of the towed object.

When it is determined that the part or all of the towed object has been detached from the small planing watercraft 32, the display device 60 displays notification information notifying detachment.

Determination on whether the part or all of the towed object has been detached from the small planing watercraft 32 may be made by the image processing device 270. In the present embodiment, the captured image data acquired by the imaging device 50 is provided to the image processing device 270. The storage device 72 of the image processing device 270 stores a detachment sensing program 272c. The image processing device 270 performs image processing, such as image extraction processing, on the captured image data in accordance with the detachment sensing program 272c to determine whether the part or all of the towed object has been detached from the small planing watercraft 32. The signal from the speed detection unit 80 is also provided to the image processing device 270. The signal indicating the speed of the small planing watercraft 32 is output from the speed detection unit 80. The speed detection signal is subjected to processing to determine whether the small planing watercraft 32 is sailing.

An example of processing performed by the image processing device 270 will be described.

In a step S11, the image processing device 270 determines whether the small planing watercraft 32 is traveling based on the speed detection signal from the speed detection unit 80. Processing in the step S11 is repeated when the determination is negative, and processing proceeds to a step S12 when the determination is affirmative. Determination on whether the small planing watercraft 32 is sailing may be made based on the image captured by the imaging device 50. For example, a characteristic shape may be extracted from the captured image, and determination on whether the small planing watercraft 32 is sailing may be made based on movement of the characteristic shape.

In the step S12, determination on whether there is the towed object is made based on the captured image. In a case where the player Q of wakeboarding or water skiing is assumed as the towed object, image processing to recognize a human face is performed on the captured image. It is determined that there is the towed object when the face is recognized in the captured image. It may be determined that there is the towed object when the face is recognized and the area of the face has a value exceeding a predetermined reference value. In this case, it may be determined that there is the towed object or there is not the towed object when the area of the face has the same value as the predetermined reference value. This suppresses false recognition that there is the towed object in a case where a face that is not the towed object appears at a farther location. When it is determined that there is not the towed object in the step S12, processing returns to the step S11 to repeat the above-mentioned processing. When it is determined that there is the towed object, processing proceeds to a step S13. A sensor, such as a load sensor, may be attached to the towing rope attachment portion 38, and the determination on whether there is the towed object may be made by sensing a hook attached to the towing rope attachment portion 38.

In the step S13, determination on whether the towed object has been detached is made. It may be determined that the towed object has been detached in the step S13, for example, when processing similar to processing performed in the above-mentioned step S12 is performed, and it is determined that there is not the towed object. That is to say, in a case where it is determined that there is the towed object in the step S12, and then it is determined that there is not the towed object in the step S13, the towed object once having existed during sailing is lost, and thus it can be determined that the towed object has been detached. When it is determined that the towed object has been detached in the step S13, processing proceeds to a step S14. It may be determined that the towed object has been detached in the step S13 when time during which it is determined that there is not the towed object exceeds or becomes equal to or longer than reference time set in advance.

In the step S14, a detachment notification instruction is output. The detachment notification instruction is provided to the display program 72a, for example, and a signal to cause the display device 60 to display detachment notification information is output from the image processing device 270 through the display program 72a. FIG. 14 illustrates an example of the display screen 62 of the display device 60. In the example of FIG. 14, the captured image is displayed on the display screen 62, and characters "FALLEN OVERBOARD!" 63M are displayed as the detachment notification information on the captured image. The detachment notification information may be another type of character information or may be a drawing to alert the operator. The operator P can thereby easily recognize detachment of the towed object by viewing the display device 60.

When it is determined that the towed object has not been detached in the step S13, processing proceeds to a step S15. In the step S15, the image processing device 270 determines whether the small planing watercraft 32 has stopped based on the speed detection signal from the speed detection unit 80. When the determination is negative, processing returns to the step S13. When the determination is affirmative, processing returns to the step S11. As described in the step S11, determination on whether the small planing watercraft 32 has stopped may be made based on the image captured by the imaging device 50 in the step S15.

According to the present modification, when the small planing watercraft 32 sails while towing the player Q of wakeboarding or water skiing, the operator P can easily recognize falling overboard of the player Q.

In the present modification, the image captured by the imaging device 50 is information to notify detachment of the part or all of the towed object. The imaging device 50 can thus be understood as one example of a sensor to notify detachment of the part or all of the towed object. The image processing device 270 and the display device 60 can be understood as a notification processing device notifying the operator P of detachment of the towed object based on an output of the sensor. The present embodiment thus discloses a small planing watercraft including the sensor outputting information for determining that the part or all of the towed object has been detached and the notification processing device notifying the operator of detachment of the towed object based on the output of the sensor.

In this case, the sensor is not limited to the above-mentioned imaging device 50. The sensor notifying that the part or all of the towed object has been detached may be an infrared sensor that can be used as a sensor to sense a human body, for example. In this case, the notification processing device may sense the presence or absence of the human body based on an output of the infrared sensor, and may notify detachment of the towed object when the human body is no longer sensed after sensing of the human body.

The sensor may be a wireless receiver to receive a signal from a wireless terminal device accompanying the towed object. In this case, the notification processing device may notify detachment of the towed object based on an output of the wireless receiver as the sensor when reception intensity of the wireless terminal device at the wireless receiver falls below or becomes equal to or smaller than a reference value set in advance.

The sensor may be a load sensor to sense a load applied to the towing rope attachment portion 38. In this case, the notification processing device may notify detachment of the towed object based on an output of the load sensor when the load applied to the towing rope attachment portion 38 falls below or becomes equal to or smaller than a reference value set in advance.

The sensor may be a sensor to sense a state of an internal combustion engine or an engine to be a drive source for sailing of the small planing watercraft 32, and output the state. For example, the sensor may sense rpm of the internal combustion engine or a motor. It is considered that, upon detachment of the towed object, a rapid decrease of a load can cause a rapid change of the drive source, such as a rapid increase in rpm. The notification processing device may notify detachment of the towed object based on an output of the sensor when a change in rpm (corresponding to acceleration) as detected per unit time exceeds or becomes equal to or greater than a reference value set in advance.

A notification unit notifying detachment of the towed object is not limited to the above-mentioned display device 60, and may be a light emitting unit (e.g., a light emitting diode and a lamp) notifying detachment of the towed object by the presence or absence of light emission, a beeper or a speaker notifying detachment of the towed object by a sound, and the like.

As a third modification, the display device 60 may display an image while switching between a gauge display priority mode and a captured image display priority mode.

Figure 15:
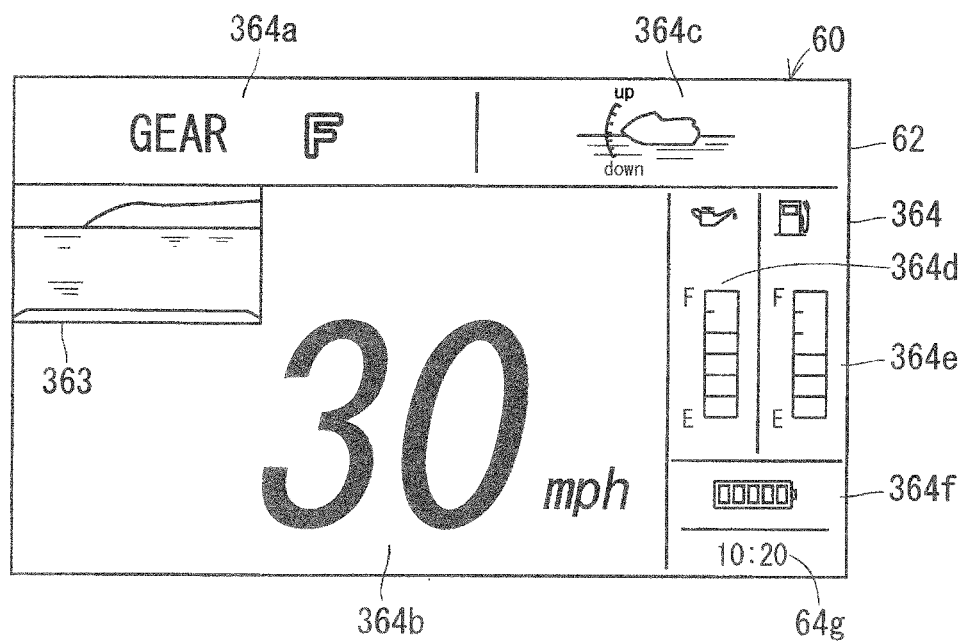
FIG. 15 illustrates an example of display in a gauge display priority mode according to a third modification.

The gauge display priority mode is, for example, a mode including a gauge display region 364 as illustrated in FIG. 15. The gauge display region 364 is a region to display gauge information on a state of the small planing watercraft 32 as illustrated for the gauge display region 64 in the embodiment. Information on at least one gauge should be displayed in the gauge display region 364. In an example illustrated in FIG. 15, the gauge display region 364 includes a gear position display region 364a, a speed display region 364b, a trim angle display region 364c, an oil level display region 364d, a fuel level display region 364e, and a battery level display region 364f. The speed display region 364b is the largest region including the central portion of the display screen 62. The gear position display region 364a and the trim angle display region 364c are arranged horizontally from left to right above the speed display region 364b. To the right of the speed display region 364b, the oil level display region 364d and the fuel level display region 364e are arranged side by side, and the battery level display region 364f is disposed below the oil level display region 364d and the fuel level display region 364e. The clock display region 64g is disposed below the battery level display region 364r, but the clock display region 64g may not necessarily be disposed.

The captured image display priority mode is, for example, a mode including the captured image display region 63 as illustrated in FIG. 6. The captured image display region 63 is a region to display all or part of the image captured by the imaging device 50. In FIG. 6, the captured image display region 63 is the largest region including the central portion of the display screen 62.

The above-mentioned gauge display priority mode is a mode in which the gauge display region 364 is larger than the captured image display region. A size of the captured image display region to be compared is herein a size of the captured image display region in the gauge display priority mode. The gauge display priority mode may or may not include the captured image display region. In a case where the gauge display priority mode does not include the captured image display region, the gauge display region 364 is larger than the captured image display region because the size of the captured image display region is "0". FIG. 15 illustrates an example in which the gauge display priority mode includes a captured image display region 363. For example, the captured image display region 363 is displayed in a corner region (an upper left corner region in FIG. 15) of the speed display region 364b to be smaller than the speed display region 364b. The gauge display region 364 including the speed display region 364b and the like is thus larger than the captured image display region 363.

The captured image display priority mode is a mode in which the captured image display region 63 is larger than the gauge display region 64. A size of the gauge display region 64 to be compared is herein a size of the gauge display region in the captured image display priority mode. The captured image display priority mode may or may not include the gauge display region. In a case where the captured image display priority mode does not include the gauge display region, the captured image display region 63 is larger than the gauge display region because the size of the gauge display region is "0". FIG. 6 illustrates an example in which the captured image display priority mode includes the gauge display region 64. For example, the gauge display region 64 is set above and to the right of the captured image display region 63. The captured image display region 63 is displayed in a region including the center of the display screen 62 to be the largest, and a size of the display region is larger than a total area of the gauge display region 64.

Switching between the captured image display priority mode and the gauge display priority mode of the above-mentioned display device 60 may be achieved by operation on a mode switching receiving unit receiving switching of the display mode. The mode switching receiving unit may be the operation receiving unit 76 in the above-mentioned embodiment. The mode switching receiving unit may be a touch panel incorporated in the display device 60. In any case, the mode switching receiving unit can receive operation to switch the display mode performed by the operator P.

Figure 16:
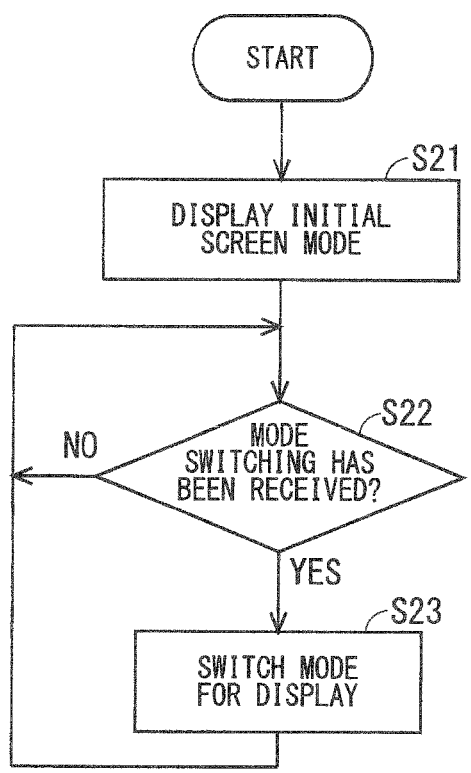
FIG. 16 is a flowchart showing an example of switching processing performed by an image processing device according to the above-mentioned modification.

FIG. 16 is a flowchart showing an example of switching processing performed by the image processing device 70 according to the present modification.

That is to say, after the start of the image processing device 70, the image processing device 70 causes the display device 60 to display an image in an initial screen mode in a step S21. The initial screen mode is a display mode set as a mode of an image to be displayed first after the start. The initial screen mode may be the gauge display priority mode or the captured image display priority mode. The initial screen mode may be a mode of an image displayed at the end of previous start of the image processing device 70.

In the next step S22, the image processing device 70 determines whether switching of the mode has been received through the mode switching receiving unit. For example, the image processing device 70 receives switching of the mode when the operator P operates the operation receiving unit 76. Processing in the step S22 is repeated when it is determined that switching of the mode has not been received, and processing proceeds to the next step S23 when it is determined that switching of the mode has been received. In the step S23, the mode is switched for display. When an image is being displayed in the gauge display priority mode, for example, the mode is switched so that the display device 60 displays an image in the captured image display priority mode. When an image is being displayed in the captured image display priority mode, for example, the mode is switched so that the display device 60 displays an image in the gauge display priority mode. Processing then returns to the step S22.

According to this example, a display mode of the display device 60 is switchable between the gauge display priority mode and the captured image display priority mode by the operation of the operator P on the mode switching receiving unit. The display mode can thus be switched to the gauge display priority mode in a case where the towed object is not towed and can be switched to the captured image display priority mode in a case where the towed object is towed, for example. As described above, a state is switchable between a state in which gauge display is easily visible and a state in which the captured image is easily visible in accordance with a sailing state.

An image may be displayed in the gauge display priority mode in an initial state, and the mode may be switched to the captured image display priority mode when determination on whether towing is being performed is made based on the output of the sensor or the captured image, and it is determined that towing is being performed as described in the above-mentioned second modification. Determination on whether towing is being performed can be made, for example, based on the image captured by the imaging device 50.

The mode may be switched to the captured image display priority mode when it is determined that rearward movement is being performed based on the gear position and the like, and may be switched to the gauge display priority mode when it is determined that forward movement is being performed.

An example in which the imaging device 50 captures an image behind the small planing watercraft 32 has mainly been described in the above-mentioned embodiment, but an installation location and the imaging range of the imaging device 50 are not limited to those in the above-mentioned example. As shown as an imaging device 450 in alternate long and two short dashes lines in FIG. 1, the imaging device may be incorporated in the small planing watercraft 32 at a location where the imaging device 450 captures an image in water with at least part (e.g., a lens surface) of the imaging device 450 being immersed in water when the small planing watercraft 32 is in the moored state. This allows for capturing of the image in water while eliminating the influence of reflection on the water surface, and identification in water using a clear image in water. According to the present modification, the imaging device 450 can also capture an image in the blind area G below the body 34.

Even in a case where the imaging device 50 is located above the water surface, the clear image in water can be captured while the influence of reflection on the water surface is reduced by applying a polarized light filter to the imaging device 50.

The operator P is not required to be seated to operate the small planing watercraft 32, and may operate the small planing watercraft 32 while holding the handle 44 in a standing position. For example, the small planing watercraft 32 may not include the seat 40.

The imaging device 50 is not required to be fixed to the body 34 through the case 52. The imaging device 50 may directly be fixed to the body 34. The imaging device 50 may be disposed to be embedded in the body 34 without protruding from the body 34. In this case, an exterior portion of a portion of the body 34 in which the imaging device 50 is disposed may be translucent or transparent to the extent that the imaging device 50 can capture an image.

In the present embodiment, an example in which the display device to display the captured image and the display device to display various pieces of the gauge information on the small planing watercraft 32 are the same display device 60 has been described. However, the display device to display the captured image and the display device to display the gauge information may be different display devices.

The display device 60 may not be included in the small planing watercraft 32, and the captured image data acquired by the imaging device 50 may be displayed by a mobile terminal or may be stored in a storage medium detachable from the small planing watercraft 32.

An example in which the small planing watercraft 32 mainly uses the internal combustion engine as the drive source has been described in the above-mentioned embodiment. The small planing watercraft 32 may be a watercraft traveling by being driven by the electrical motor. In this case, in the display device 60, the oil level display region 64*d* and the fuel level display region 64*e* may be omitted, and a level of a battery for electrical motor driving may be displayed in the battery level display region 64*f*.

Configurations described in the above-mentioned embodiment and modifications can be combined with each other as appropriate unless any contradiction occurs.

The foregoing description is in all aspects illustrative and does not restrict the present invention. It is understood that numerous modifications not having been described can be devised without departing from the scope of the present invention.

The present disclosure includes the following aspects.

A first aspect is a small planing watercraft with an imaging device including: the imaging device incorporated in the small planing watercraft, and capturing an image of surroundings of the small planing watercraft; and a display device incorporated in the small planing watercraft at a location where the display device is recognizable by an operator of the small planing watercraft, and displaying the image of surroundings captured by the imaging device.

According to the small planing watercraft with the imaging device, the image of surroundings captured by the imaging device is displayed by the display device. The image of surroundings displayed by the display device is recognized by the operator of the small planing watercraft. The operator can thereby more easily recognize surrounding conditions during sailing of the small planing watercraft.

A second aspect is the small planing watercraft with the imaging device according to the first aspect, wherein the display device may be located in front of a location of the operator of the small planing watercraft, and may display at least one of fuel level information, oil level information, and battery level information. In this case, the operator of the small planing watercraft can identify level information of at least one of fuel, oil, and battery, and recognize the image of surroundings through the same display device.

A third aspect is the small planing watercraft with the imaging device according to the first or second aspect, wherein the imaging device is incorporated in the small planing watercraft at a location where the imaging device is capable of capturing an image including a range to be a blind area for the operator of the small planing watercraft. The operator can thereby easily identify the range to be the blind area.

A fourth aspect is the small planing watercraft with the imaging device according to any one of the first to third aspects, wherein the imaging device may be incorporated in the small planing watercraft to be capable of capturing an image behind the small planing watercraft. The image behind the small planing watercraft can thereby easily be identified during sailing of the small planing watercraft.

A fifth aspect is the small planing watercraft with the imaging device according to the fourth aspect, wherein the imaging device may be incorporated in the small planing watercraft in an orientation to capture an image behind and obliquely above the small planing watercraft when the small planing watercraft is in a moored state. A front portion of the small planing watercraft is oriented upward when the small planing watercraft starts sailing. When the imaging device is in the orientation to capture the image behind and obliquely above the small planing watercraft as in the fifth aspect, the image on a water surface in a wide range can be captured during sailing.

A sixth aspect is the small planing watercraft with the imaging device according to the fourth or fifth aspect, wherein the imaging device may have a property of capturing an image in a range having a wider angle in a horizontal direction than in a vertical direction when the small planing watercraft is in a moored state. This makes it easy for the display device to display an image in a horizontally wide range, and makes it easy for the operator to view the image in the horizontally wide range.

A seventh aspect is the small planing watercraft with the imaging device according to any one of the first to sixth aspects, wherein the imaging device may be incorporated in the small planing watercraft at a location and in an orientation enabling capturing of an image of at least part of a body of the small planing watercraft. In this case, at least part of the body can be displayed in the image of surroundings displayed by the display device. A sense of distance and a positional relationship between a subject in the image of surroundings and the small planing watercraft and the like can thereby easily be understood.

An eighth aspect is the small planing watercraft with the imaging device according to any one of the first to seventh aspects, wherein the imaging device may be incorporated in the small planing watercraft to be capable of capturing an image of a mount of a body of the small planing watercraft on which baggage is mountable. In this case, the mount can be displayed in the image of surroundings displayed by the display device. The operator can thereby identify conditions of the baggage mounted on the mount.

A ninth aspect is the small planing watercraft with the imaging device according to any one of the fourth to eighth aspects, wherein the imaging device may be incorporated in the small planing watercraft to be located above a towing rope attachment portion. In this case, the towing rope attached to the towing rope attachment portion is less likely to appear in close-up in the image captured by the imaging device.

A tenth aspect is the small planing watercraft with the imaging device according to any one of the first to ninth aspects, wherein the imaging device is located between a first portion of the small planing watercraft and a second portion of the small planing watercraft below the first portion, and inward of the first portion and the second portion in a fore-aft direction when the small planing watercraft is in a moored state. In this case, physical impact, such as hitting of the imaging device by an object, can be suppressed by the first portion and the second portion.

An eleventh aspect is the small planing watercraft with the imaging device according to any one of the first to tenth aspects, wherein a portion of the small planing watercraft in which the imaging device is incorporated protrudes beyond a surrounding portion. In this case, the small planing watercraft is less likely to appear, and the image of surroundings in a wide range is captured.

A twelfth aspect is the small planing watercraft with the imaging device according to any one of the first to eleventh aspects, wherein the imaging device may be incorporated in the small planing watercraft at a location where the imaging device captures an image in water with at least part thereof being immersed in water when the small planing watercraft is in a moored state. The operator can thereby identify an image in water using a clear image in water.

A thirteenth aspect is the small planing watercraft with the imaging device according to any one of the first to twelfth aspects that may further includes an image storage device for storing at least one of a still image and a moving image captured by the imaging device. The still image or the moving image during sailing is thereby stored.

A fourteenth aspect is the small planing watercraft with the imaging device according to any one of the first to thirteenth aspects that may further includes an image processing device controlling a display range of the image of surroundings to be displayed by the display device. This allows for control of the display range of the image of surroundings to be displayed by the display device to thereby contribute to improvement in visibility.

A fifteenth aspect is the small planing watercraft with the imaging device according to any one of the first to fourteenth aspects that may further includes a sailing behavior detection unit detecting a sailing behavior related to a heading direction of the small planing watercraft, wherein the image of surroundings displayed by the display device may change depending on an output of the sailing behavior detection unit. The image of surroundings in accordance with the heading direction is thereby displayed by the display device.

A sixteenth aspect is the small planing watercraft with the imaging device according to any one of the fourth to fifteenth aspects, wherein the imaging device may capture an image for determining whether part or all of a towed object has been detached from the small planing watercraft, and, when it is determined that the part or all of the towed object has been detached from the small planing watercraft, the display device may display notification information notifying detachment. In this case, when the small planing watercraft sails while towing a wakeboard and the like, for example, the operator of the small planing watercraft can easily recognize falling overboard of a rider of the wakeboard.

A seventeenth aspect is the small planing watercraft with the imaging device according to any one of the first to sixteenth aspects, wherein a display mode of the display device is switchable between a gauge display priority mode including a gauge display region and a captured image display priority mode including a captured image display region, the gauge display priority mode is a mode in which the gauge display region is larger than the captured image display region, the captured image display priority mode is a mode in which the captured image display region is larger than the gauge display region, and the small planing watercraft may further include a mode switching receiving unit receiving switching of the display mode of the display device. The display mode of the display device can thereby be switched between the gauge display priority mode and the captured image display priority mode when the mode switching receiving unit receives operation.

A surrounding image imaging device for a small planing watercraft according to an eighteenth aspect includes: an imaging device incorporated in the small planing watercraft, and capturing an image of surroundings of the small planing watercraft; and a display device incorporated in the small planing watercraft at a location where the display device is recognizable by an operator of the small planing watercraft, and displaying the image of surroundings captured by the imaging device.

According to the surrounding image imaging device for the small planing watercraft, the image of surroundings captured by the imaging device is displayed by the display device. The image of surroundings displayed by the display device is recognized by the rider of the small planing watercraft. The operator can thereby more easily recognize the surrounding conditions during sailing of the small planing watercraft.

A nineteenth aspect is the surrounding image imaging device for the small planing watercraft according to the eighteenth aspect, wherein the display device is located in front of a location of the operator of the small planing watercraft, and displays at least one of fuel level information, oil level information, and battery level information. The operator of the small planing watercraft can thereby recognize the image of surroundings while identifying level information of a power source.

A small planing watercraft according to a twentieth aspect includes: a sensor outputting information for determining that part or all of a towed object has been detached; and a device notifying an operator of detachment of the towed object based on an output of the sensor.

According to the small planing watercraft, when the small planing watercraft sails while towing the wakeboard and the like, for example, the operator of the small planing watercraft can easily recognize falling overboard of the rider of the wakeboard.

What is claimed is:

1. A small planing watercraft with an imaging device, the small planing watercraft comprising:
   the imaging device incorporated in the small planing watercraft, and capturing an image of surroundings of the small planing watercraft; and
   a display device incorporated in the small planing watercraft at a location where the display device is recognizable by an operator of the small planing watercraft, and displaying the image of surroundings captured by the imaging device,
   wherein, when the small planing watercraft is in a moored state, an optical axis of the imaging device extends behind and obliquely above the small planing watercraft to capture an image behind and obliquely above the small planing watercraft.

2. The small planing watercraft with the imaging device according to claim 1, wherein
   the display device is located in front of a location of the operator of the small planing watercraft, and displays at least one of fuel level information, oil level information, and battery level information.

3. The small planing watercraft with the imaging device according to claim 1, wherein
   the imaging device is incorporated in the small planing watercraft at a location where the imaging device is capable of capturing an image including a range to be a blind area for the operator of the small planing watercraft.

4. The small planing watercraft with the imaging device according to claim 1, wherein
the imaging device has a property of capturing an image in a range having a wider angle in a horizontal direction than in a vertical direction when the small planing watercraft is in a moored state.

5. The small planing watercraft with the imaging device according to claim 1, wherein
the imaging device is incorporated in the small planing watercraft at a location and in an orientation enabling capturing of an image of at least part of a body of the small planing watercraft.

6. The small planing watercraft with the imaging device according to claim 1, wherein
the imaging device is incorporated in the small planing watercraft to be capable of capturing an image of a mount of a body of the small planing watercraft on which baggage is mountable.

7. The small planing watercraft with the imaging device according to claim 1, wherein
the imaging device is located between a first portion of the small planing watercraft and a second portion of the small planing watercraft below the first portion, and inward of the first portion and the second portion in a fore-aft direction when the small planing watercraft is in a moored state.

8. The small planing watercraft with the imaging device according to claim 1, wherein
a portion of the small planing watercraft in which the imaging device is incorporated protrudes beyond a surrounding portion.

9. The small planing watercraft with the imaging device according to claim 1, wherein
the imaging device is incorporated in the small planing watercraft at a location where the imaging device captures an image in water with at least part thereof being immersed in water when the small planing watercraft is in a moored state.

10. The small planing watercraft with the imaging device according to claim 1, the small planing watercraft further comprising
an image storage device for storing at least one of a still image and a moving image captured by the imaging device.

11. The small planing watercraft with the imaging device according to claim 1, the small planing watercraft further comprising
an image processing device controlling a display range of the image of surroundings to be displayed by the display device.

12. A small planing watercraft with an imaging device, the small planing watercraft comprising:
the imaging device incorporated in the small planing watercraft, and capturing an image of surroundings of the small planing watercraft;
a display device incorporated in the small planing watercraft at a location where the display device is recognizable by an operator of the small planing watercraft, and displaying the image of surroundings captured by the imaging device; and
a sailing behavior detection unit detecting a sailing behavior related to a heading direction of the small planing watercraft, wherein
the image of surroundings displayed by the display device changes depending on an output of the sailing behavior detection unit.

13. A small planing watercraft with an imaging device, the small planing watercraft comprising:
the imaging device incorporated in the small planing watercraft, and capturing an image of surroundings of the small planing watercraft including an image behind the small planing watercraft; and
a display device incorporated in the small planing watercraft at a location where the display device is recognizable by an operator of the small planing watercraft, and displaying the image of surroundings captured by the imaging device; wherein
the imaging device captures an image for determining whether part or all of a towed object has been detached from the small planing watercraft, and
when it is determined that the part or all of the towed object has been detached from the small planing watercraft, the display device displays notification information notifying detachment.

14. A small planing watercraft with an imaging device, the small planing watercraft comprising:
the imaging device incorporated in the small planing watercraft, and capturing an image of surroundings of the small planing watercraft; and
a display device incorporated in the small planing watercraft at a location where the display device recognizable by an operator of the small planing watercraft, and displaying the image of surroundings captured by the imaging device; wherein
a display mode of the display device is switchable between a gauge display priority mode including a gauge display region and a captured image display priority mode including a captured image display region,
the gauge display priority mode is a mode in which the gauge display region is larger than the captured image display region,
the captured image display priority mode is a mode in which the captured image display region is larger than the gauge display region, and
the small planing watercraft further includes a mode switching receiving unit receiving switching of the display mode of the display device.

15. A small planing watercraft with an imaging device, the small planing watercraft comprising:
the imaging device incorporated in the small planing watercraft above a towing rope attachment portion, and capturing an image of surroundings of the small planing watercraft including an image behind the small planing watercraft; and
a display device incorporated in the small planing watercraft at a location where the display device is recognizable by an operator of the small planing watercraft, and displaying the image of surroundings captured by the imaging device.

* * * * *